(12) United States Patent
Cotrell

(10) Patent No.: US 11,655,794 B2
(45) Date of Patent: May 23, 2023

(54) MARINE-PUMPED HYDROELECTRIC ENERGY STORAGE

(71) Applicant: RCAM Technologies, Inc., Boulder, CO (US)

(72) Inventor: Jason Rust Cotrell, Boulder, CO (US)

(73) Assignee: RCAM Technologies, Inc., Boulder, CO (US)

( * ) Notice: Subject to any disclaimer, the term of this patent is extended or adjusted under 35 U.S.C. 154(b) by 0 days.

(21) Appl. No.: 17/681,133

(22) Filed: Feb. 25, 2022

(65) Prior Publication Data

US 2022/0178340 A1 Jun. 9, 2022

Related U.S. Application Data

(63) Continuation of application No. PCT/US2021/026558, filed on Apr. 9, 2021.

(Continued)

(51) Int. Cl.
| | | |
|---|---|---|
| *F03B 13/06* | (2006.01) | |
| *F03D 9/28* | (2016.01) | |
| *F03D 9/00* | (2016.01) | |

(52) U.S. Cl.
CPC .............. *F03B 13/06* (2013.01); *F03D 9/008* (2013.01); *F03D 9/28* (2016.05); *F05B 2240/40* (2013.01);
(Continued)

(58) Field of Classification Search
CPC .. F03B 13/06; F03D 9/28; F03D 9/008; F05B 2260/422; F05B 2240/40; F05B 2240/95;
(Continued)

(56) References Cited

U.S. PATENT DOCUMENTS

| 8,698,338 B2 | 4/2014 | Slocum et al. |
| 9,617,970 B2 | 4/2017 | Schmidt-Bocking et al. |

(Continued)

FOREIGN PATENT DOCUMENTS

| WO | 2009037533 | 3/2009 |
| WO | 2012119758 | 9/2012 |

(Continued)

OTHER PUBLICATIONS

KIPO, International Search Report and Written Opinion dated Jul. 8, 2021, in PCT/US2021/026558 (RCAMT-005WO1), 11 pgs.

(Continued)

*Primary Examiner* — Viet P Nguyen
(74) *Attorney, Agent, or Firm* — Henry Patent Law Firm PLLC

(57) ABSTRACT

In a general aspect, a system stores energy underwater. In some aspects, the system includes a base having a bottom side resting on an underwater floor and a top side that includes recessed surfaces. The system also includes domed walls extending from the top side of the base to form respective fluid chambers. Each of the fluid chambers includes an interior volume that is at least partially defined by one of the recessed surfaces and an interior surface of one of the domed walls. The system additionally includes a pump and a generator. The pump is configured to transport water from the fluid chambers toward an exterior environment of the system. The generator is configured to generate electrical energy in response to water flowing from the exterior environment toward the fluid chambers.

26 Claims, 16 Drawing Sheets

Related U.S. Application Data

(60) Provisional application No. 63/007,558, filed on Apr. 9, 2020.

(52) U.S. Cl.
CPC ....... *F05B 2240/95* (2013.01); *F05B 2240/97* (2013.01); *F05B 2250/241* (2013.01); *F05B 2260/422* (2020.08); *F05B 2270/18* (2013.01)

(58) Field of Classification Search
CPC ............ F05B 2240/97; F05B 2250/241; F05B 2270/18
See application file for complete search history.

(56) References Cited

U.S. PATENT DOCUMENTS

| | | | |
|---|---|---|---|
| 2011/0215650 A1* | 9/2011 | Slocum | F03D 9/255 290/55 |
| 2013/0257057 A1 | 10/2013 | Legacy | |
| 2014/0197641 A1 | 7/2014 | Barakat | |
| 2015/0048623 A1 | 2/2015 | Stephan et al. | |
| 2019/0106854 A1 | 4/2019 | Lang | |

FOREIGN PATENT DOCUMENTS

| | | | |
|---|---|---|---|
| WO | WO-2020084152 A2 * | 4/2020 | ............... F03B 1/00 |
| WO | 2021207588 | 10/2021 | |

OTHER PUBLICATIONS

"What is shotcrete and when is it used?", American Concrete Institute; downloaded from https://www.concrete.org/tools/frequentlyaskedquestions.aspx?faqid=746 on Mar. 10, 2021, 2 pgs.

Hahn, et al., "Techno-economic assessment of a subsea energy storage technology for power balancing services", Fraunhofer Institute for Wind Energy and Energy System Technology (IWES), Division Energy process Technology, May 24, 2017, 7 pgs.

Larson, "The Hydropower Industry's Sustainability Conundrum", https://www.powermag.com/the-hydropower-industrys-sustainability-conundrum/. Mar. 1, 2021, 6 pgs.

Puchta et al., "Development and testing of a novel offshore pumped storage concept for storing energy at sea—Stensea", Fraunhofer Institute for Wind Energy and Energy System Technology—IWES, Jul. 23, 2017, 5 pgs.

Slocum, "Symbiotic Offshore Energy Harvesting and Storage Systems", Sustainable Energy Technologies and Assessments, Sep. 2015, 12 pgs.

* cited by examiner

MARINE-PUMPED HYDROELECTRIC ENERGY STORAGE

CROSS-REFERENCE TO RELATED APPLICATIONS

This application is a continuation of PCT Application No. PCT/US2021/026558, filed Apr. 9, 2021, entitled "Marine-Pumped Hydroelectric Energy Storage", which claims priority to U.S. Provisional Application No. 63/007,558, which was filed on Apr. 9, 2020 and entitled, "Industrialized Ocean-Energy-Storage." The disclosures of this these priority applications are hereby incorporated by reference in their entirety.

BACKGROUND

The following description relates to marine-pumped hydroelectric energy storage, including systems therefor and methods of installing, operating, maintaining, and recovering such systems.

Long term energy storage is used to complement variable sources of electrical production such as wind and solar energy that vary with wind and sun availability. Grid operators can use energy storage to level variable electrical energy generation sources such as wind and solar, thereby providing storage needed to increase levels of renewable energy deployment while maintaining grid reliability.

DETAILED DESCRIPTION

Figure 1:
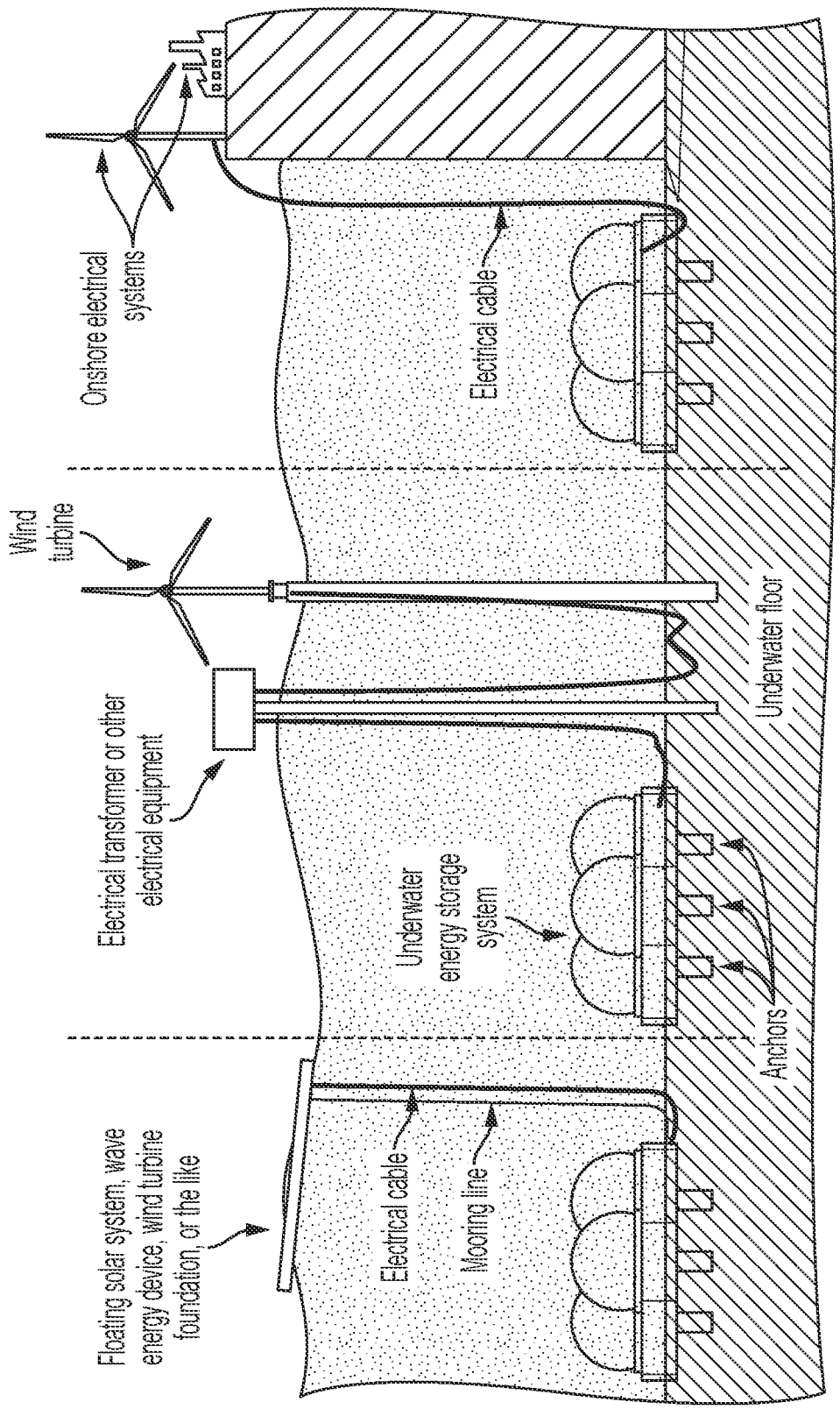
FIG. 1 is a schematic diagram of various examples of marine-pumped hydroelectric (MPH) technology deployed in an offshore environment.

Aspects of what is described here relate to marine-based underwater pumped hydroelectric systems. In some implementations, the marine-pumped hydroelectric (MPH) technologies described can provide a low risk, low cost, long-term energy storage solution. The technologies described here include industrialized underwater energy storage systems, devices and components, and related methods of installation, operation, maintenance, and recovery.

In some aspects of operation, MPH technologies can extract, store, and utilize energy from hydrostatic pressure in oceans, lakes, or other types of natural or manmade bodies of water. To use this potential energy, a large hollow concrete vessel can be installed in deep water, and a pump-turbine associated with the hollow sphere allows the storing of electrical energy. For example, to store energy, water can be pumped out of the hollow sphere against the pressure of the surrounding water, and the process can be reversed to generate electricity. MPH technologies can be deployed in a variety of subsea or other underwater environments, for example, in deep lakes and oceans (e.g., approximately 100-m to 2000-m deep) and other environments. MPH technologies can also operate in coordination with other systems and equipment, for example, to provide energy storage for floating offshore equipment, fixed-bottom offshore equipment, onshore electrical equipment, or a combination of electrical systems. Examples of such coordination are described below in relation to FIG. 1.

MPH technologies can be utilized virtually throughout the world, including, North America, Europe, Asia, Australia, and South America. For example, the MPH technologies described herein can be deployed in the deep lakes and oceans of the United States, such as those on the U.S. West Coast, East Coast, and Great Lakes. As an example of the energy potential of MPH technologies, California is estimated to have approximately 100 GW of underwater pumped energy storage resource potential, which is about 25 times California's existing installed pumped hydropower power capacity.

In some instances, the MPH technologies can be implemented with a modular design that is highly scalable for deployments with power capacities as little as 100 kW to 10

MW per storage sphere. The long-term energy storage provided by these technologies could help enable economic development of 120 GW of floating offshore wind energy potential along California's 800 miles of coastline. This offshore wind energy potential corresponds to about $1 trillion worth of wind plant installations, which could produce about one and a half times all the electricity currently consumed by California. As another example, integrating systems based on the MPH technologies with a single offshore wind plant of 2 GW capacity (about 200 turbines) may provide as much electrical energy production as the Hoover Dam can generate in 4 hours at full capacity.

In some instances, aspects of the MPH technologies described herein can provide advantages and improvements over conventional, ocean-based underwater pumped hydro systems. These advantages and improvements may, for example, ease installation, maintenance, recovery, and manufacturing of such systems, thereby reducing costs in all water depths. In some examples, advantages are obtained by coupling several storage spheres to a single generator/pump assembly. This coupling can reduce the overall cost of an energy storage system (e.g., for all water depths) by reducing the number of parts and providing easier access for generator/pump maintenance and inlet/outlet screen cleaning. The cost reduction is notable for systems in shallow water (e.g., in the U.S. Great Lakes) in which more spheres are needed to counteract the effects of the reduced hydrostatic pressure that results from the lower submersion depth. Moreover, the use of numerous interconnected storage spheres, instead of one large storage sphere, may reduce the overall size of the storage spheres. This reduced overall size can be manufactured more easily while still allowing for a similar amount of energy storage capacity (e.g., reducing the storage spheres from 30-m in diameter to 10-m in diameter).

A rigid coupling of several storage spheres is also possible. Such rigid coupling, along with the use of a concrete base, may increase the ability to tow the storage sphere(s) in shallow ports. The rigid coupling may also provide additional mass needed to anchor the sphere, and increase the stability of the entire system during towing and installation. This increased stability may result by the concrete base creating a shape that acts as a raft or barge. The concrete base may also lower the center of gravity of the system. Further advantages can be obtained by utilizing a base and domes designed to facilitate automated 3D concrete printing, alternative concrete manufacturing methods such as spraying or pre-casting concrete, or manufacturing of smaller modular or sectional components that may reduce the overall cost of the structure. In some cases, the base cavities, domes, and access lid are easier to print in sections because they may reduce overhangs that are difficult to print compared to printing an entire sphere continuously, and because the base can provide support surfaces to print the cavities.

Figure 2A:
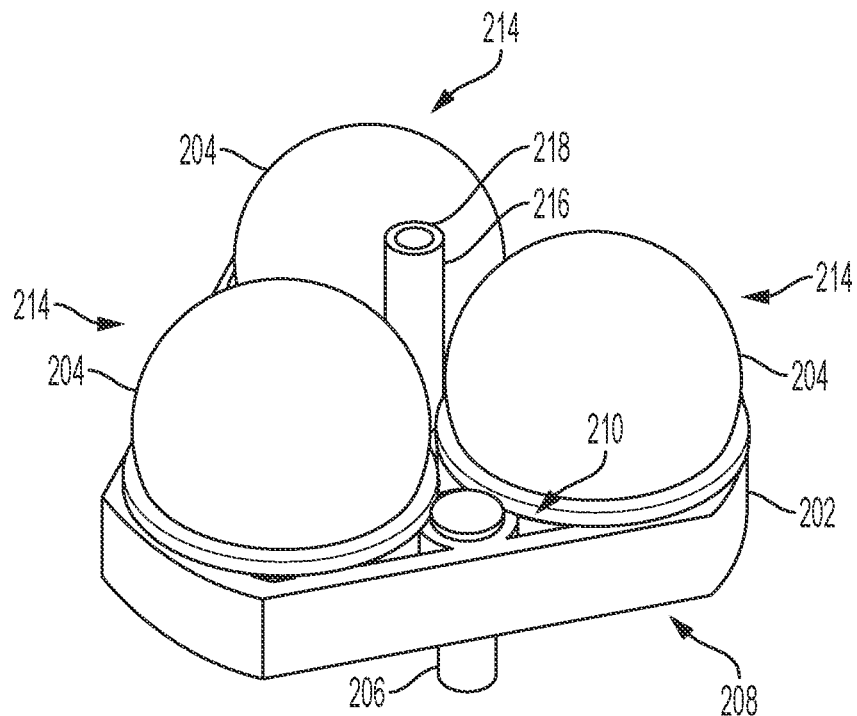
FIG. 2A is a schematic diagram, in perspective view, of an example system for storing energy underwater.
Figure 2B:
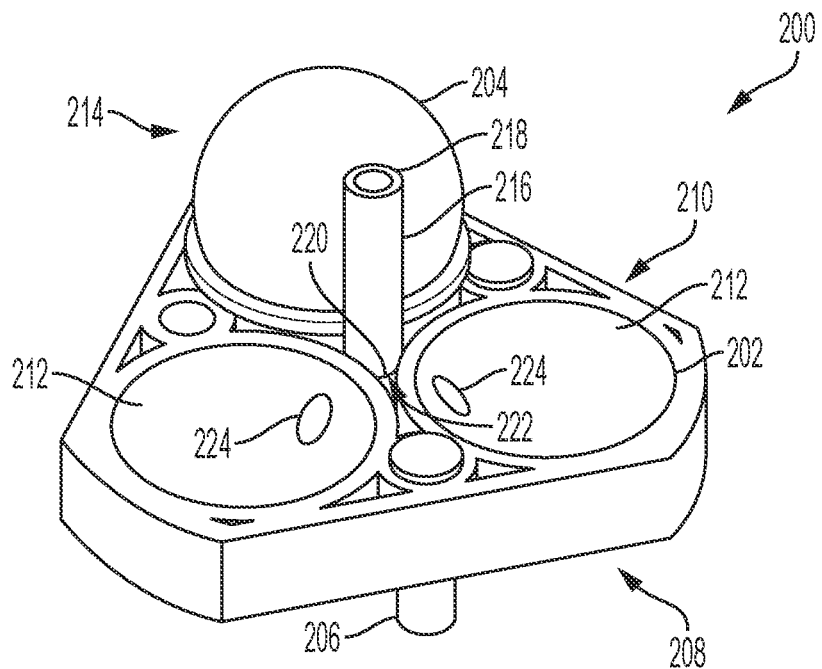
FIG. 2B is a schematic diagram, in perspective view, of the example system of FIG. 2A, but with two domed walls and an anchor absent.

Now referring to FIG. 1, a schematic diagram is presented of various examples of MPH technology deployed in an offshore environment. MPH technology, however, may also be deployed in another environment. The various examples of MPH technology include an example underwater energy storage system that is anchored to the sea floor. In some instances, the example underwear energy storage system includes a mooring line, such as to couple to another structure (e.g., a floating solar system, wave energy device, wind turbine foundation, etc.). In some instances, the example underwater storage system includes an electrical cable for communicating electrical energy, such as with a transformer, a source of electrical energy (e.g., a floating solar system, a wave energy device, a wind turbine, etc.), an on-shore electrical system, and so forth. The example underwater energy storage system is also shown in FIGS. 2A-2B. For example, FIG. 2B presents the example underwater storage system with two of three pressure domes absent and one anchor removed to help show features of a base subcomponent. The MPH technologies described herein may allow for other configurations of the underwater energy storage system. For example, the configurations may include additional or different features, and the components may be arranged in another manner.

In some aspects of operation, the example underwater energy storage system shown in FIGS. 1 and 2A-2B can interact with other systems (e.g., the other systems shown in FIG. 1) to receive input energy (e.g., for long term storage) or provide output energy (e.g., for consumption or other applications). The physical principle of operation may be similar to the concept of conventional pumped-hydroelectric storage plants located onshore. A concrete hollow sphere is placed deep underwater on an underwater floor. To store input energy—e.g., during periods when wind and/or photovoltaic systems produce a high amount of electricity by wind, or when the price of electricity on the wholesale market is low—a pump turbine pumps water out of the hollow sphere. In some cases, the evacuated water is not replaced by atmospheric air in the hollow sphere, which may result in a pressure at or below atmospheric pressure in the hollow sphere. To provide output energy—e.g., during periods of high electricity demand, or when electricity prices are high—high pressure water surrounding the hollow sphere is allowed to flow back into the hollow sphere through a turbine and generator, which in response to this flow, generates electricity.

As shown in FIGS. 1 and 2A-2B, the example underwater energy storage system includes three pressure domes. The three pressure domes are combined with a spherical bottom enclosure to form three storage spheres. The example underwater energy storage system also includes a base, which may contain the bottom enclosure of the storage spheres. The example underwater energy storage system additionally includes a pump/generator assembly and anchors.

In many implementations, the example underwater energy storage system includes multiple storage spheres. In these implementations, one or more pressure domes may interface with the base to create an approximately spherical rigid volume. The spherical rigid volume may include an inlet and/or an outlet that allows water to flow into and/or out of the spherical rigid volume. Such flow may allow a pump/generator assembly to consume or generate electricity.

Figure 2C:
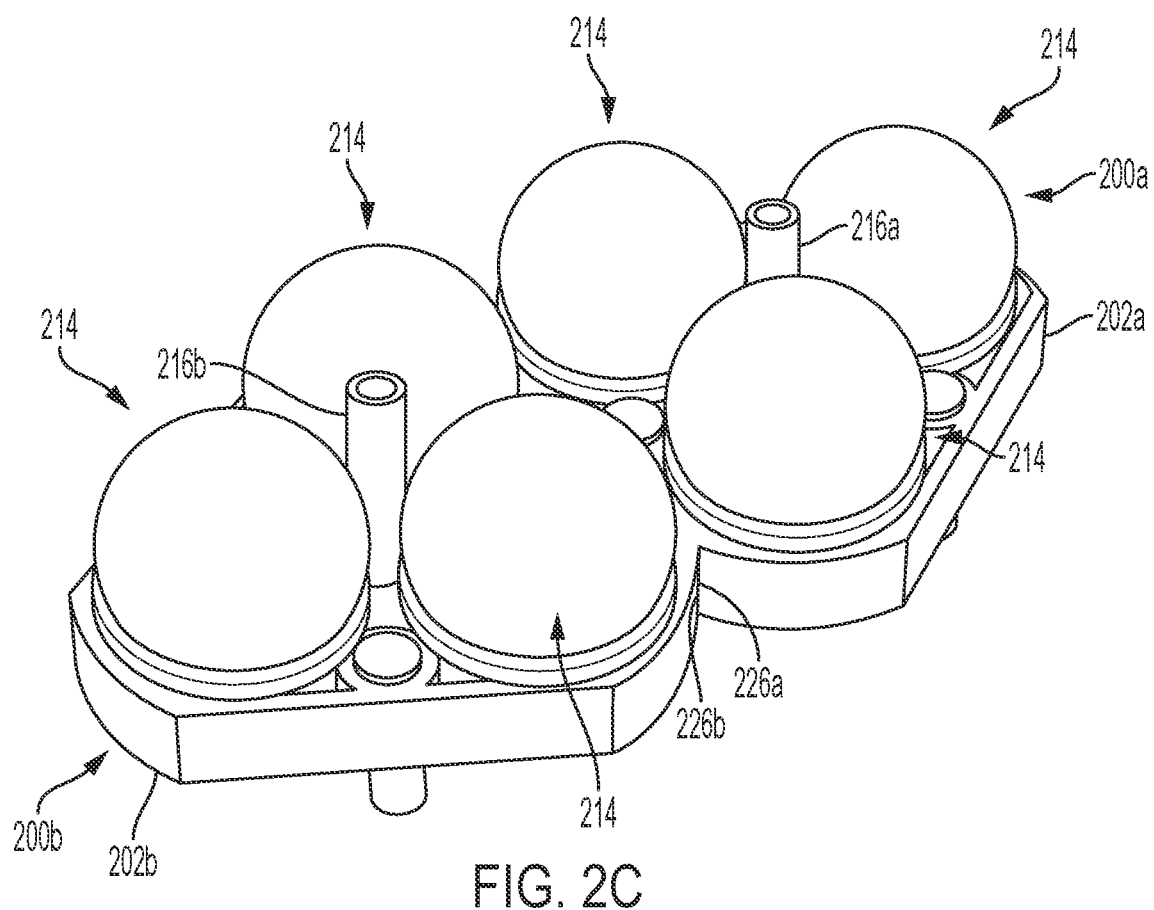
FIG. 2C presents a schematic diagram, in perspective view, of two instances of the example system of FIG. 2A coupled to each other through a mating mechanical interface.

In many implementations, the example underwater energy storage system includes a base. The base can be configured to achieve one or more functions. For example, the base may: (1) create an enclosure (e.g., a spherical enclosure) in conjunction with the pressure domes; (2) provide ports, conduits, or pipes to channel the water from the enclosures through one or more pumps/generators, to an inlet and/or an outlet, or other pressure domes if desired; (3) provide a mount for a pump/generator assembly; (4) provide a structure through which to anchor the system using anchors such as piles or suction anchors; (5) provide a coupling interface for joining one or more modules (e.g., as shown in FIG. 2C); (6) provide one or more buoyancy chambers to facilitate transport, installation, and recovery of the storage module; (7) act as a barge to facilitate floatation and stability during towing, installation, or retrieval of the module; or (8) provide additional mass needed to hold the module down when the storage spheres are empty.

Now referring to FIG. 2A, a schematic diagram is presented, in perspective view, of an example system 200 for storing energy underwater. The example system 200 is configured to operate in an underwater environment, such as when secured to an underwater floor (e.g., as shown in FIG. 1 or otherwise). The system 200 may operate while fully submerged in a body of water, for example, in a deep lake, an ocean, a sea, a reservoir, or another body of water. The system 200 may be anchored or otherwise secured to a seafloor, a lakebed, an underwater platform, or another type of underwater floor.

The example system 200 includes a base 202 and a plurality of domed walls 204. FIG. 2B presents a schematic diagram, in perspective view, of the example system 200 of FIG. 2A, but with two domed walls 204 and an anchor 206 absent. The base 202, which may be generally tabular in shape, has a bottom side 208 configured to rest on an underwater floor and a top side 210 that includes a plurality of recessed surfaces 212. During operation, the bottom side 208 of the base 202 rests on the underwater floor and may be anchored thereto via one or more anchors 206. In some variations, such as shown in FIG. 2B, the plurality of recessed surfaces 212 are defined by spherical cap-shaped depressions in base 202 on the top side 210. However, other types of depressions or shapes are possible.

Figure 5:
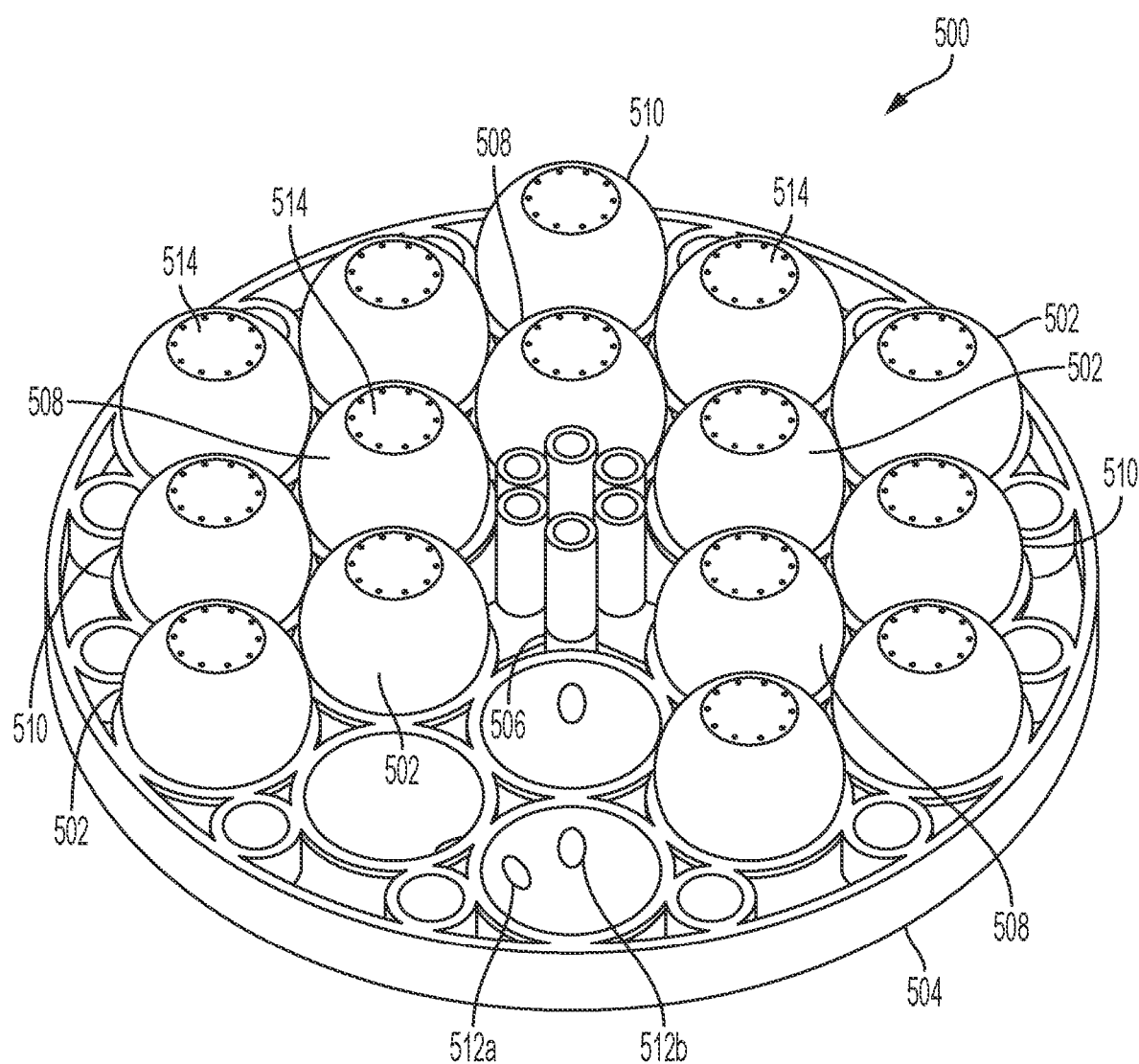
FIG. 5 is a schematic diagram, in perspective view, of an example system that includes a hexagonal array of domed walls extending from a base.

The plurality of domed walls 204 extend from the top side 210 of the base 202 to form respective fluid chambers 214. Each of the fluid chambers 214 includes an interior volume that is defined by one of the recessed surfaces 212 and an interior surface of one of the domed walls 204. The interior surface of each domed wall 204 bounds a partially-enclosed volume of the domed wall 204. Moreover, a perimeter edge of the domed wall 204 encircles an opening into the partially-enclosed volume. In many variations, such as shown in FIGS. 2A-2B, the interior surface of each domed wall 204 faces a respective recessed surface 212 and is aligned therewith. In some variations, one or more of the domed walls 204 may include an access lid or hatch (e.g., as shown in FIG. 5) to provide selective access to the interior volume of an associated fluid chamber. The access lid or hatch may be positioned on the domed wall 204 opposite the top side 210 of the base 202.

FIGS. 2A-2B present each of the fluid chambers 214 as being spherical. In this configuration, the interior surfaces of the domed walls 204 and recessed surfaces 212 correspond to spherical cap-shaped surfaces that join, in respective pairs, to complete a spherical surface. However, other shapes are possible for the domed walls 204, the recessed surfaces 212, and the fluid chambers 214 (e.g., spheroidal, cylindrical, cylindrical, frustoconical, or an irregular shape). In some cases, the domed walls 204 and the recessed surfaces 212 have cap-shaped surfaces of different radii or other distinct geometric properties. Alternative shapes for the fluid chambers 214 could also be used to replace the domed walls 204, for instance, with tubular walled structures (e.g., pipes). However, domed wall shapes may provide certain advantages. For example, compared to a tubular structure, a spherical shape may require approximately only one-half the material for construction for a given volume and pressure. The lower amount of material may be due to an ability of the spherical shape to equally balance compressive hydrostatic forces.

In some implementations, the base 202 and the plurality of domed walls 204 are an integral body. For example, the base 202 and each of the domed walls 204 may be formed of the same material, without distinct edges or separation between the base 202 and the respective domed walls 204.

In some implementations, such as shown in FIGS. 2A-2B, the base 202 and the plurality of domed walls 204 are separate bodies. In these implementations, each of the domed walls 204 includes a perimeter edge encircling an opening of the domed wall 204. The perimeter edge may be sealed to the top side 210 of the base 202. In many instances, the base 202 and the plurality of domed walls 204 are rigidly coupled to each other.

In some variations, the example system 200 includes various ports, conduits, tubes, or other structures that define one or more flow paths through the example system 200, including a first and second flow path. In some cases, the first and second flow paths include shared flow path sections, or they may be entirely distinct flow paths. In some cases, an individual flow path may include one or more branches or sections that flow in parallel, such as to or from different inlets or outlets. The first flow path may provide fluid communication through the pump, between the fluid chambers 214 and the exterior environment. As such, at least a portion of the first flow path is provided by the pump in the example system 200. The first flow path may also extend through part of the base 202 or other components of the example system 200. The second flow path may provide fluid communication through the generator, between the fluid chambers 214 and the exterior environment. As such, at least a portion of the second flow path is provided by the generator in the example system 200. The second flow path may also extend through part of the base 202 or other components of the system 200.

The example system 200 also includes a pump and a generator. The pump is configured to transport water from the fluid chambers 214 toward the exterior environment of the example system 200, such as along the first flow path. During operation, the pump causes water to flow from the interior volumes of the fluid chambers 214 into the body of water in which the example system 200 operates. In some variations, the pump includes a turbine configured to convert mechanical energy (e.g., a motion of turbine surfaces) into hydraulic energy (e.g., a flow or pressure of water). For example, the turbine may include blades or vanes that, during motion, contact the water to induce a flow of the water. The generator is configured to generate electrical energy in response to water flowing from the exterior environment toward the fluid chambers 214, such as along the second flow path. During operation, the generator responds to water flowing from the body of water in which the example system 200 operates into the interior volumes of the fluid chambers 214. In many variations, the generator includes a turbine with turbine surfaces configured to contact the flowing water and convert hydraulic energy into mechanical energy (e.g., a motion of the turbine surfaces). For example, the flowing water may contact blades or vanes of the turbine to induce their motion (e.g., rotation, translation, etc.).

In some implementations, such as shown in FIGS. 2A-2B, the example system 202 includes a housing 216 that contains both the pump and the generator (e.g., contains a combined pump/generator assembly). The housing 216 may be coupled to the base, or in some instances, the housing 216 may be integral to the base. In these implementations, the housing 216 includes a first housing port 218 and a second housing port 220. For example, the housing 216 may include a tubular structure extending between two open ends that serve as respective ports (e.g., an inlet, an outlet, etc.). A third flow path extends between the fluid chambers 214 and the exterior environment of the system and comprises at least a portion extending through the housing 216 between the first and second housing ports 218, 220. The pump is configured to pump water along the third flow path from the fluid chambers 214 toward the exterior environment, and the generator is configured to generate electrical energy in response to water flowing along the third flow path from the exterior environment into the fluid chambers 214.

Although FIGS. 2A-2B illustrate the pump and the generator as contained within a single housing, other configurations are possible. For example, in some implementations, the example system 200 includes a pump housing and a generator housing. The pump housing contains the pump and includes first and second pump housing ports. Similarly, the generator housing contains the generator and includes first and second generator housing ports. One or both of the pump and generator housing may be coupled to the base 202. In some implementations, the first flow path extends between the fluid chambers 214 and the exterior environment of the example system 200 and includes at least a portion extending through the pump housing between the first and second pump housing ports. The pump is configured to pump water along the first flow path from the fluid chambers 214 toward the exterior environment. In these implementations, the second flow path, which is distinct from the first flow path, extends between the fluid chambers 214 and the exterior environment and includes at least a portion extending through the generator housing between the first and second generator housing ports. The generator is configured to generate electrical energy in response to water flowing along the second flow path from the exterior environment toward the fluid chambers 214. Further examples of housing configurations for the pump and the generator are described below in relation to FIG. 8.

The pump, the generator, or both may correspond to respective assemblies—e.g., a pump assembly, a generator assembly, and a combined pump/generator assembly—that engage water flowing into or out of the fluid chambers 214. For example, the pump assembly can include components such as a pump, a turbine, water ports, one or more valves, a debris screen, and so forth; the generator assembly can include components such as a generator, a turbine, water ports, one or more valves, a debris screen, and so forth; and the combined pump/generator assembly can include components such as a pump, a generator, a turbine, water ports, one or more valves, a debris screen, and so forth. Some of the components of these assemblies may be coupled to or integrated into a respective housing (e.g., a pump housing, a generator housing, a single unified housing, etc.) In some implementations, the example system 200 includes one or more generator assemblies or one or more combined pump/generator assemblies to generate electricity when water is flowing into the fluid chambers 214. The flow direction is reversed when the fluid chambers 214 are used to store energy, e.g., by pumping water out of the fluid chambers 214 using one or more pump assemblies or the one or more combined pump/generator assemblies. In these implementations, electricity to and from the example system 200 may be routed through an electrical cable to a surface of the water, such as to an electrical system on an offshore platform.

Figure 4A:
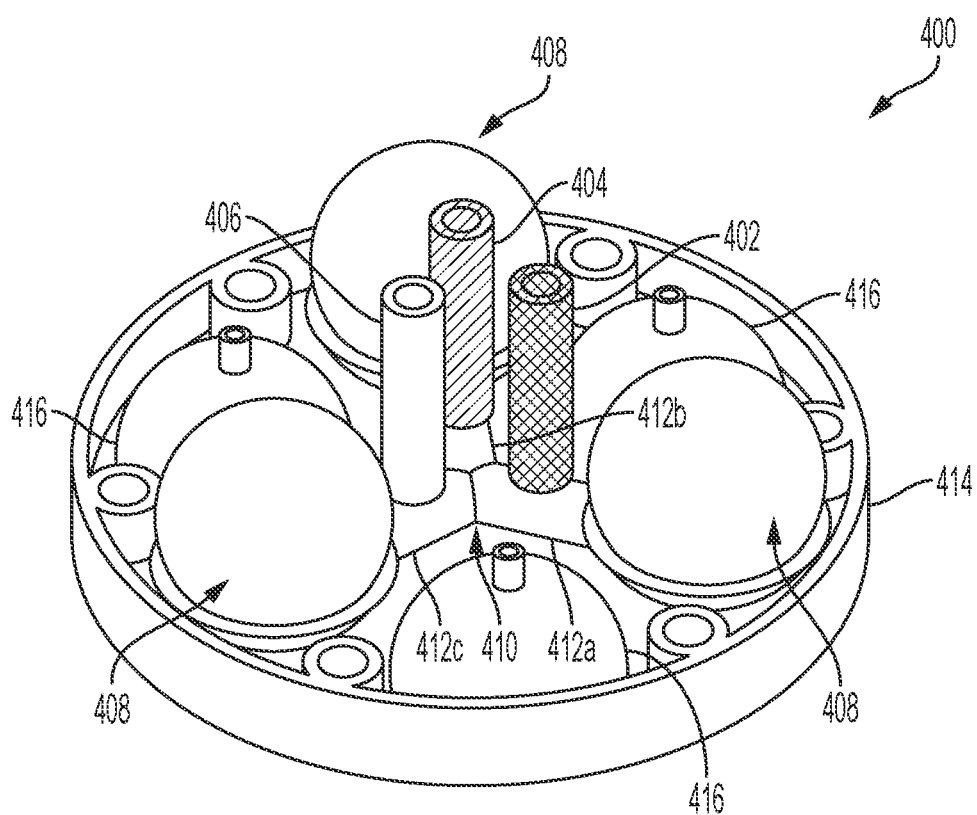
FIG. 4A is a schematic diagram, in perspective view, of an example system that includes a pump housing, a generator housing, and a combined pump/generator housing that are external to fluid chambers of the example system.

The pump, generator, and combined pump/generator assemblies may be located external to the fluid chambers 214. For example, FIG. 4A presents a schematic diagram, in perspective view, of an example system 400 that includes a pump housing 402, a generator housing 404, and a combined pump/generator housing 406 that are external to fluid chambers 408. The example system 400 may be analogous to the example system 200 described in relation to FIGS. 2A-2B.

Figure 4B:
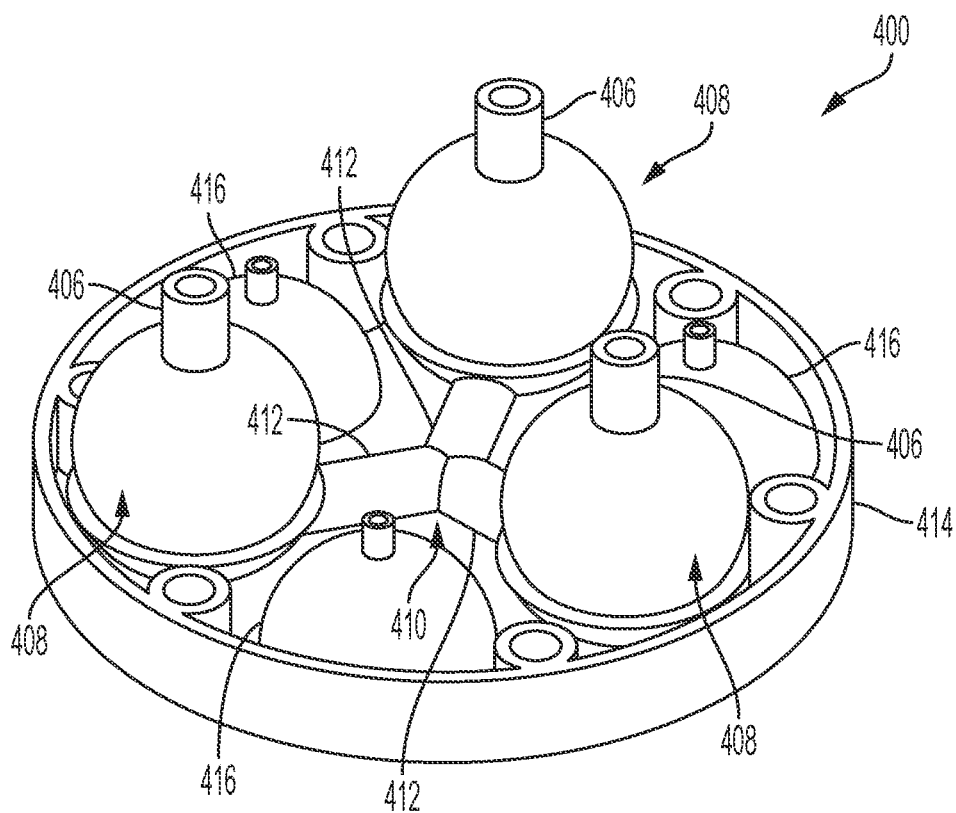
FIG. 4B is a schematic diagram, in perspective view, of the example system of FIG. 4A, but in which each fluid chamber has a portion of a combined pump/generator housing internal thereto.

The pump housing 402, the generator housing 404, and the combined pump/generator housing 406 may contain, respectively, a pump assembly, a generator assembly, and a combined pump/generator assembly. In some cases, the pump, generator, and combined pump/generator assemblies may be located internal to one or more of the fluid chambers 408. For example, FIG. 4B presents a schematic diagram, in perspective view, of the example system 400 of FIG. 4A, but in which each fluid chamber 408 has a portion of a combined pump/generator housing 406 internal thereto.

In some instances, locating the assemblies externally may ease the removal and replacement of such assemblies for maintenance purposes. Such external location may also allow the fluid chambers to utilize a reduced number of assemblies. This reduced number may lower the parts needed to support an MPH system as well as increase its storage capacity (relative to its power generation capacity). Increasing the storage capacity may be economically preferable for installations in shallow water where hydrostatic pressures are lower. However, other deployments may also benefit from an increased storage capacity. In some configurations, such as shown in FIG. 4B, the system 400 may include separate pump and generator assemblies. Separating the pump and generator assemblies may allow the pump and generator to run independently or simultaneously, if needed, to provide nearly immediate electrical production without delaying equipment startup. It will be appreciated that the assemblies—e.g., the pump assembly, the generator assembly, and the combined pump/generator assembly—along with components thereof (e.g., the water inlet/outlets, debris screens, etc.) may be designed to match a configuration of the example system 200, a means of transport and installation, and a deployment location. Other criteria are possible.

Figure 3:
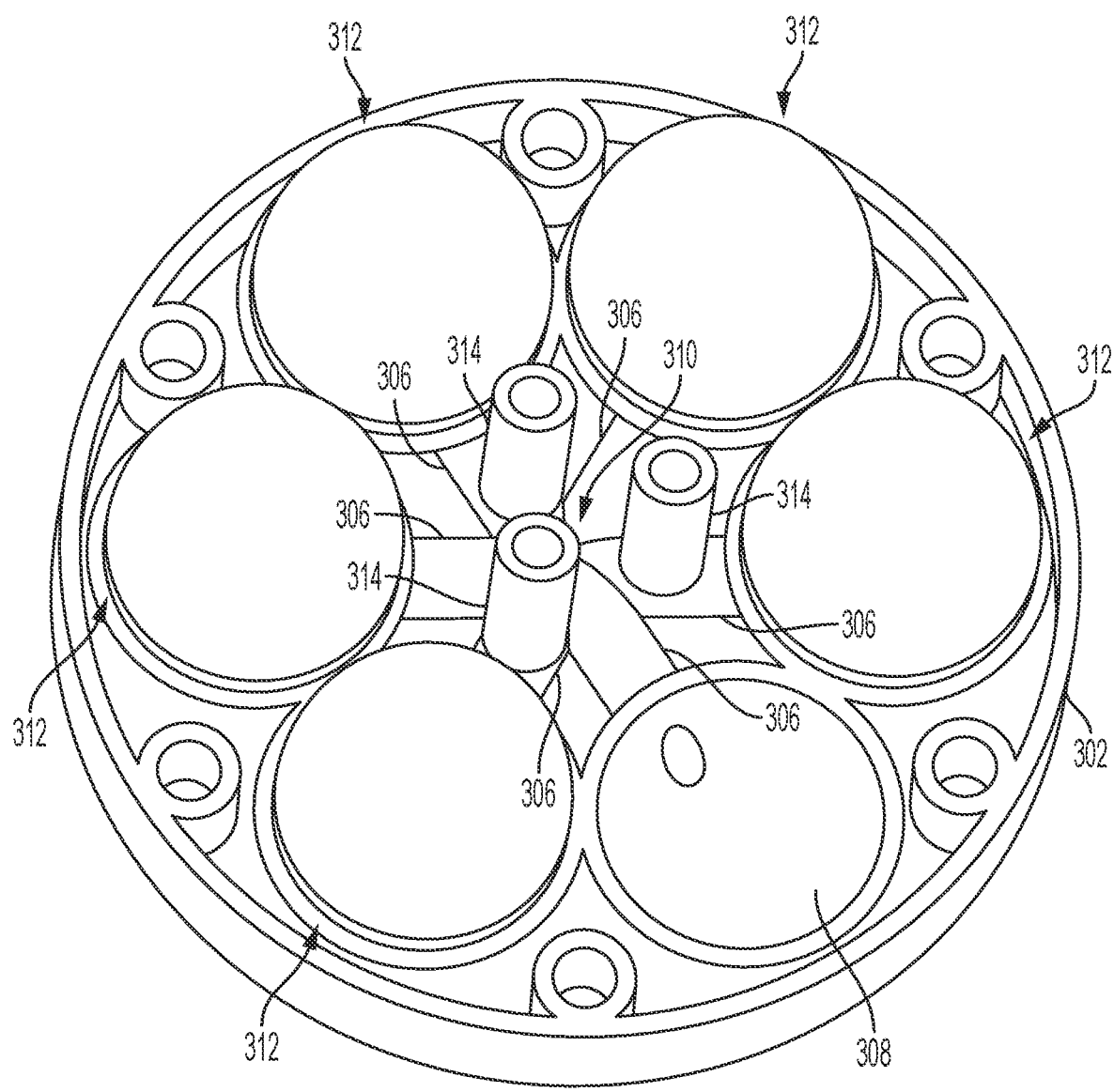
FIG. 3 is a schematic diagram, in perspective view, of an example system having a base that includes a conduit system.

Now referring back to FIGS. 2A-2B, the base 202 of the example system 200 may include a conduit system 222 providing fluid communication between the fluid chambers 214. For example, FIG. 3 presents a schematic diagram, in perspective view, of an example system 300 having a base 302 that includes a conduit system 304. The example system 300 may be analogous to the example system 200 described in relation to FIGS. 2A-2B. The conduit system 304 includes individual conduits 306 extending from recessed surfaces 308 of the base 302 to meet at a central union 310. This configuration allows the conduit system 304 to provide fluid communication between the fluid chambers 312. Now referring back to FIGS. 2A-2B, in some variations, the conduit system 222 may be integral to the base 202. For example, the base 202 may include interior surfaces defining the conduit system 222, such as through walls integral to the base 202. In some variations, the recessed surfaces 212 on the top side 210 of the base define respective conduit ports 224 to the conduit system 222.

In some implementations, the conduit system 222 provides fluid communication between the pump and the fluid chambers 214 and defines at least part of a flow path (e.g., the first flow path) extending between the fluid chambers 214 and the exterior environment of the system. For example, as shown in FIG. 4A, the system 400 may include a conduit system 410 having a first conduit 412a with a port disposed therein. The pump housing 402, which contains a pump (or pump assembly), may include a pump housing port that is coupled to the port of the first conduit 412a. However, in some variations, the pump housing 402 is disposed through a wall of the first conduit 412a—e.g., through the port of the first conduit 412a—such that the pump housing port resides in the first conduit 412a. An example of such a configuration is shown in the leftmost illustration of FIG. 8.

Although FIG. 4A illustrates only a single pump housing, multiple pump housings and respective first flow paths are possible.

In some implementations, the conduit system 222 provides fluid communication between the generator and the fluid chambers 214 and defines at least part of a flow path (e.g., the second flow path) extending between the fluid chambers 214 and the exterior environment of the system. For example, the conduit system 410 of FIG. 4A may include a second conduit 412b with a port disposed therein. The generator housing 404, which includes a generator (or generator assembly), may include a generator housing port that is coupled to the port of the second conduit 412b. However, in some variations, the generator housing 404 is disposed through a wall of the second conduit 412b—e.g., through the port of the second conduit 412b—such that the generator housing port resides in the second conduit 412b. An example of such a configuration is shown in the center illustration of FIG. 8. Although FIG. 4A illustrates only a single generator housing, multiple generator housings and respective second flow paths are possible.

In implementations where the pump and the generator are contained in separate housings or as distinct assemblies, such a configuration may allow for an instant energy generation response. For example, while the pump operates to store energy, the generator may operate concomitantly at a lower power level. This tandem operation may reduce or avoid a "startup" delay in generating power.

In some implementations, the conduit system 222 provides fluid communication between the fluid chambers 214 and both the pump and the generator. In these implementations, the conduit system 222 defines at least part of a flow path (e.g., the third flow path) extending between the fluid chambers 214 and the exterior environment of the system. The flow path is common to the pump and the generator. For example, the conduit system 222 may include a port coupled to the second housing port 220 of the housing 216. (The housing 216 contains both the pump and the generator.) In another example, and as shown in FIG. 4A, the conduit system 410 may include a third conduit 412c with a port disposed therein. The combined pump/generator housing 406, which includes a pump (or pump assembly) and a generator (or generator assembly), may include a housing port that is coupled to the port of the third conduit 412c. However, in some variations, the combined pump/generator housing 406 is disposed through a wall of third conduit 412c—e.g., through the port of the third conduit 412c—such that the housing port resides in the third conduit 412c. An example of such a configuration is shown in the rightmost illustration of FIG. 8. Although FIGS. 2A-2B and 4A illustrate only a single housing (or a single combined pump/generator housing), multiple housings and respective first and second flow paths are possible.

In some implementations, the conduit system 220 includes a portion that provides fluid communication between adjacent fluid chambers 214 or subgroups of fluid chambers 214. For example, FIG. 5 presents a schematic diagram, in perspective view, of an example system 500 that includes a hexagonal array of domed walls 502 extending from a base 504. Three domed walls 502 have been omitted in FIG. 5 to provide visibility to a conduit system 506 of the base 504. The hexagonal array of domed walls 502 defines, with the base 504, an inner ring of fluid chambers 508 nested within an outer ring of fluid chamber 510. The conduit system 506 includes individual conduits 512 providing fluid communication between adjacent fluid chambers of the hexagonal array. A first type of individual conduit 512a may provide fluid communication between fluid chambers within a ring, such as the outer ring of fluid chambers 510. A second type of individual conduit 512b may provide fluid communication between fluid chambers of differing rings, such as between the inner and outer rings of fluid chambers 508, 510. The example system 500 of FIG. 5 also includes an access lid or hatch 514 for each of the hexagonal array of domed walls 502. The access lid or hatch 514 may allow selective access to an interior volume of an associated fluid chamber, such as may be require for maintenance or repair. The access lid or hatch 514 may also ease manufacturing of the domed walls 502, for example, by removing an overhang portion that would be necessary to complete a spherical cap shape of the domed walls 502.

Now referring back to FIGS. 2A-2B, the example system 200 may include an anchor 206 configured to couple the base 202 to the underwater floor. The anchor 206 may be operable to provide an additional downward force onto the example system 200 to counteract buoyant forces, such as when the fluid chambers 214 are empty. In some variations, the anchor 206 is configured to penetrate into the underwater floor. In these variations, the base 202 may include a mount (e.g., a through hole in the base 202) for selectively attaching and detaching the anchor 206 from the base 202. In some variations, the anchor 206 may be a suction pile. The suction pile may be part of the base 202 or may be selectively attachable or detachable from the base 202.

In some implementations, the base 202 includes a buoyancy chamber. For example, the example system 400 illustrated by FIGS. 4A-4B includes a base 414 having a plurality of buoyancy chambers 416 distinct from the fluid chambers 408. The plurality of buoyancy chambers 416 may be integral to the base 414 and may include respective ports to receive and discharge fluid (e.g., water, air, etc.). The plurality of buoyancy chambers 416 may aid in transport, installation, and retrieval of the example system 400 to or from a target location. In particular, the plurality of buoyancy chambers 416 may be emptied of water during towing, then filled with water through their respective ports to submerge the example system 400 during installation. During operation of the example system 400, the plurality of buoyancy chambers 416 may remain filled with water to provide mass and thereby aid in securing the example system 400 to the underwater floor. The plurality of buoyancy chambers 416 may also allow a greater percentage of the volume (in some cases, the full volume) of the fluid chambers 408 to be used for energy storage by pumping nearly all the water out, thereby increasing the energy storage capacity of the fluid chambers 408. In some cases, the plurality of buoyancy chambers 416 can be made less expensively than the fluid chambers 408 since they are not repeatedly cycled with water during energy storage like the fluid chambers 408.

In some implementations, the base 202 includes a pocket configured to hold ballast material. The pocket has an opening accessible from an exterior of the base 202 (or an exterior of the example system 202). The ballast material, when present, may provide mass to the example system 400 and thereby aid in securing the example system 400 to the underwater floor.

In some implementations, the example system 200 includes an anchor or ballast material for securing the base 202 to the underwater floor. For example, various types of anchors such as suction buckets, piles, screw anchors, or no anchors (relying on gravity forces) can be used to secure the example system 200 to the underwater floor. Sand or rock ballast materials can be placed in pockets of the base 202 to provide additional low-cost ballast either before transport to the target location or after the example system 200 is installed on the seafloor. In some variations, the base 202 can be configured with a skirt around its perimeter to act as a suction anchor with the underwater floor or to minimize soil scour after installation. The anchors and skirt can optionally be filled with air or balloons during transport to provide additional buoyancy especially for shallow draft ports.

Although FIGS. 2A-2B depict the example system 200 as having three fluid chambers 214, the example system 200 can have two or more fluid chambers 214. In some cases, the fluid chambers 214 (or domed walls 204 associated therewith) may range in size from about 10 meters to 30 meters in diameter for a utility scale system. Smaller fluid chambers 214 may be used, for example, to ease the complexity of manufacturing and improve the logistics of transporting, installing, and retrieving the example system 200. Similarly, the number of anchors 206, inlets, generators, pumps, or buoyancy chambers can be varied from one to a plurality as needed.

In some implementations, the fluid chambers 214 of the example system 200 are arranged in a pattern. For example, the fluid chambers 214 can be arranged in a circular pattern to provide seakeeping stability during towing, installation, and recovery. The circular pattern may also reduce or minimize a quantity of materials used to construct the base 202. Alternatively, fluid chambers 214 can be arranged in an array or matrix pattern such as a rectangle to ease the manufacturing of the base 202. For example, the base 202 may be configured in a linear or rectangular shape similar to a barge. This linear or rectangular shape may allow the base 200 (or example system 200) to fit in ports or dry docks that exist to fabricate and maintain large ships.

Figure 6A:
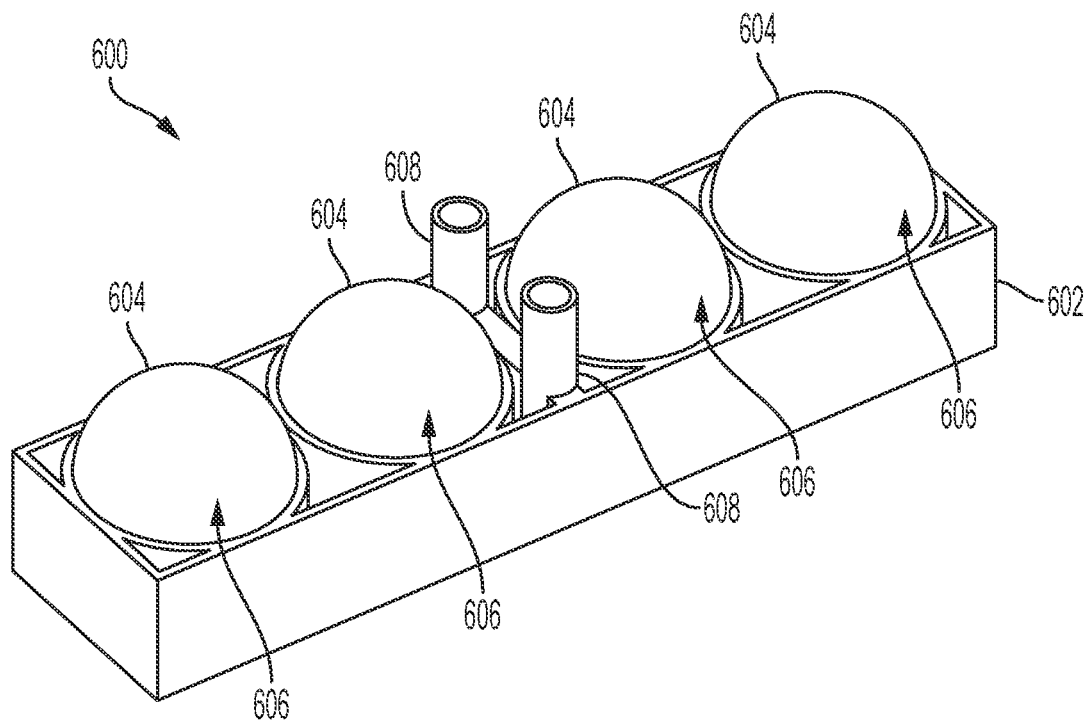
FIG. 6A is a schematic diagram, in perspective view, of an example linear-shaped system for storing energy underwater.
Figure 6B:
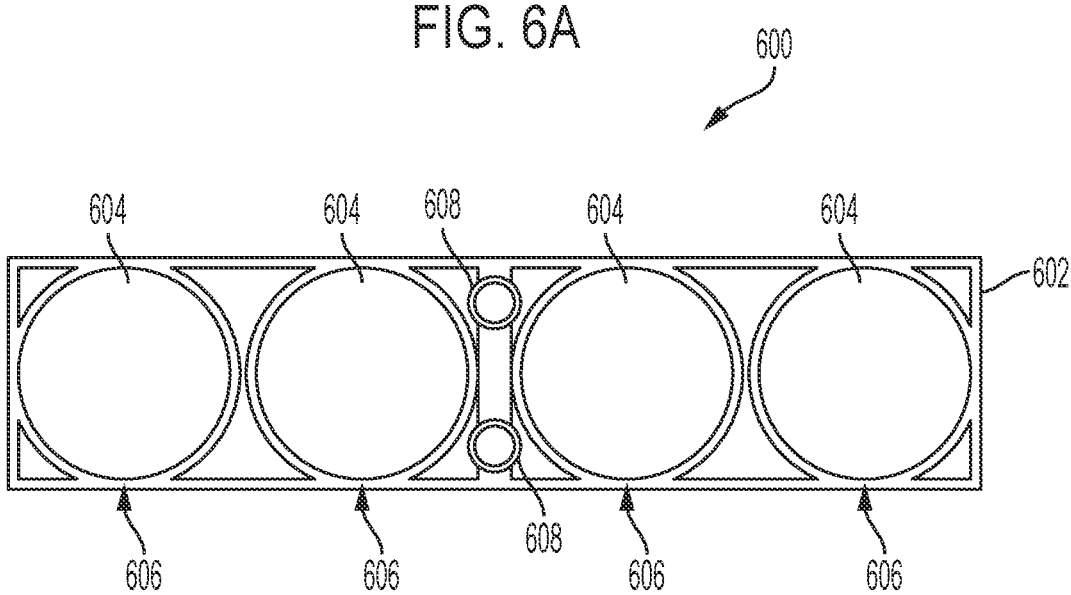
FIG. 6B is a schematic diagram, in top view, of the example linear-shaped system 600 of FIG. 6A.

For example, FIGS. 6A and 6B present respective schematic diagrams showing perspective and top views of an example linear-shaped system 600 for storing energy underwater. The example linear-shaped system 600 is analogous to the example system 200 described in relation to FIGS. 2A-2B. The example linear-shaped system 600 includes a linear base 602 and a plurality of domed walls 604 extending therefrom that collectively define a row of fluid chambers 606. The example rectangular-shaped system 600 also includes a plurality of housings 608, each containing a pump and a generator. The plurality of housings 608 are in fluid communication with the row of fluid chambers 606.

Figure 7:
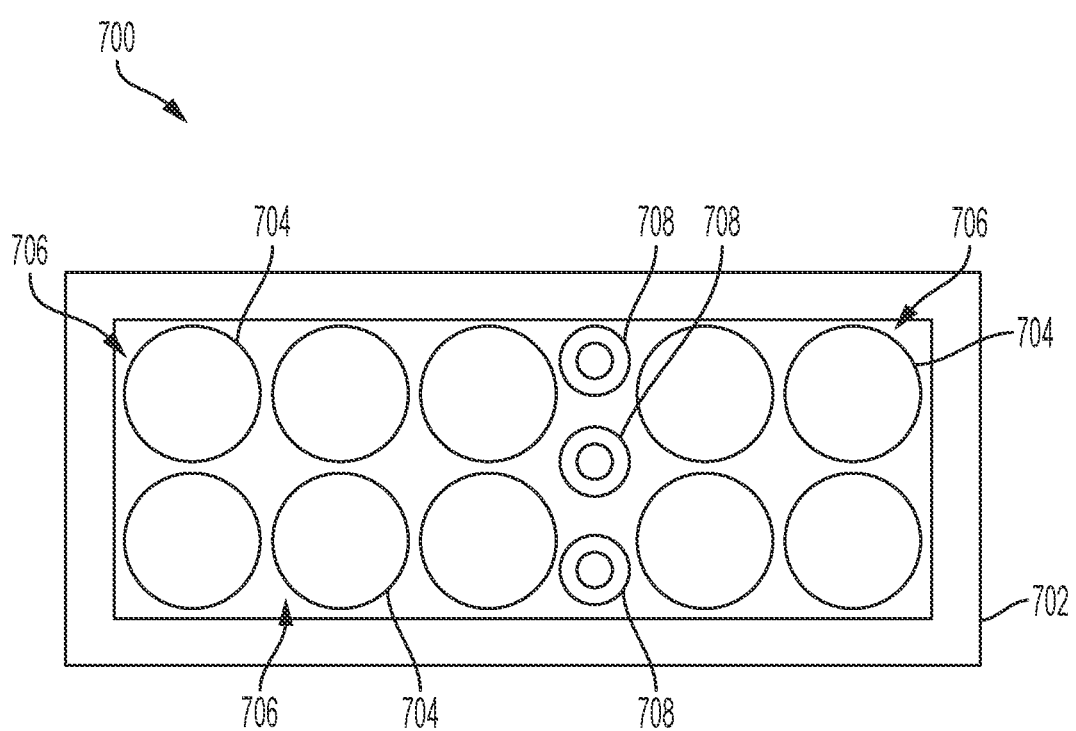
FIG. 7 is a schematic diagram, in top view, of an example rectangular-shaped system for storing energy underwater.

In another example, FIG. 7 presents a schematic diagram, in top view, of an example rectangular-shaped system 700 for storing energy underwater. The example rectangular-shaped system 700 is analogous to the example system 200 described in relation to FIGS. 2A-2B. The example rectangular-shaped system 700 includes a rectangular base 702 and a plurality of domed walls 704 extending therefrom that collectively define a rectangular array of fluid chambers 706. The example rectangular-shaped system 700 also includes a plurality of housings 708, each containing a pump and a generator. The plurality of housings 708 are in fluid communication with the rectangular array of fluid chambers 706.

In some implementations, the geometry of the domed walls 204 and the base 202 can be varied to change a relative proportion of the base 202 to the plurality of domed walls 204. The relative proportion may be selected to ease manufacturing the base 202 or the plurality of domed walls 204, to alter a buoyancy of the example system 200 for towing in available draft in the port, to achieve improved hydrodynamic stability during towing and installation, to improve a strength of the base 202 by increasing its size, or some combination thereof. For example, the base 202 and the plurality of domed walls 204 may each be associated with about half of the interior volume of the fluid chambers 214. In another example, such as shown in FIGS. 2A-2C, the base 202 and the plurality of domed walls 204 may each be associated with, respectively, about 20% and about 80% of the interior volume of the fluid chambers 214.

In some implementations, the base 202 couples the plurality of domed walls 204 together. The base 202 may also integrate hydraulic ports, provide additional gravitational mass to counteract buoyant forces, include buoyancy chambers that are independent of the fluid chambers 214, and act as a barge for floatation in shallow draft ports.

In some implementations, the base 202 may include a mechanical interface for coupling to the base of another system 200. For example, FIG. 2C presents a schematic diagram, in perspective view, of two instances 200a, 200b of the example system 200 of FIG. 2A coupled to each other through respective mechanical interfaces 226a, 226b. The mechanical interfaces 226a, 226b may include respective surfaces (e.g., flat surfaces) capable of mating with each other. One or both of the two instances 200a, 200b may include a means for selectively coupling the two instances 200a, 200b to each other. For example, a clamp may be configured to secure the mechanical interface 226a of the first instance 200a against the mechanical interface 226b of the second instance 200b. In another example, the mechanical interfaces 226a, 226b may each include a through-hole in a wall of their base. The through-holes may be positioned to align and define a continuous passage when the mechanical interfaces 226a, 226b engage each other. A threaded bolt may be disposed through the passage to secure—in conjunction with a nut and washer—the mechanical interface 226a of the first instance 200a against the mechanical interface 226b of the second instance 200b.

Each of the two instances 200a, 200b may utilize a single generator/pump assembly in a housing (e.g., respective housings 216a, 216b) to service multiple fluid chambers 214. This configuration may reduce the manufacturing cost of each instance 200a, 200b, a considerable portion of which, is anticipated to result from the pump and the generator. The configuration may also improve a reliability of the instances 200a, 200b by reducing a number of parts and possible failure modes. Limiting the number of fluid chambers 214 in each instance 200a, 200b to a small number (e.g., less than 6) can keep the base 202 small enough that an instance can be manufactured in one piece using large scale 3D concrete printing equipment. The instances 200a, 200b can also be manufactured and serviced using existing port facilities (e.g., dry docks) and equipment due to its smaller size. An instance with only one or two fluid chambers 214 may also be a desirable configuration. However, the triangular shape of an instance using three fluid chambers 214 may provide more seakeeping stability and control during towing and deployment.

The example system 200 can be deployed as a standalone, long-term energy storage system to complement onshore sources of energy generation, such as onshore wind, solar, fossil fuel electrical generation, or be synergistically integrated with offshore wind, offshore solar, or wave energy deployments. In the latter case, the example system 200 may further reduce the capital and operational costs of the integrated deployment by sharing controls, electrical cables, maintenance equipment, and so forth. The example system 200 can be deployed without being coupled to a tether, for example, not used as an anchor for a floating wind turbine. In some cases, the example system 200 may be electrically coupled to only a transformer station.

In some implementations, the example system 200 includes an electrical cable that communicates electrical power between an onshore electrical system and one or both of the pump and the generator. FIG. 1 presents an example of such a configuration in its rightmost illustration. In some implementations, the example system 200 includes an electrical cable that communicates electrical power between an offshore platform and one or both of the pump and the generator. FIG. 1 presents an example of such a configuration in its middle and leftmost illustrations. In some implementations, the example system 200 includes an electrical cable that communicates electrical power between a transformer and one or both of the pump and the generator. In these configurations, the transformer may operate to transform a voltage, a current, or a phase of electrical energy supplied to or received from the pump or the generator. For example, the transformer may step up or step down an input voltage to supply an output voltage to the pump. As another example, the transformer may step up or step down an input voltage received from the generator to provide an output voltage. In some implementations, the transformer is electrically coupled to a source of electrical energy (e.g., a solar panel, a wind turbine, a natural gas turbine, a wave energy device, etc.) or an electrical load (e.g., an electrical grid for utility service, an industrial plant, etc.). Other types of electrical connections are possible.

Figure 8:
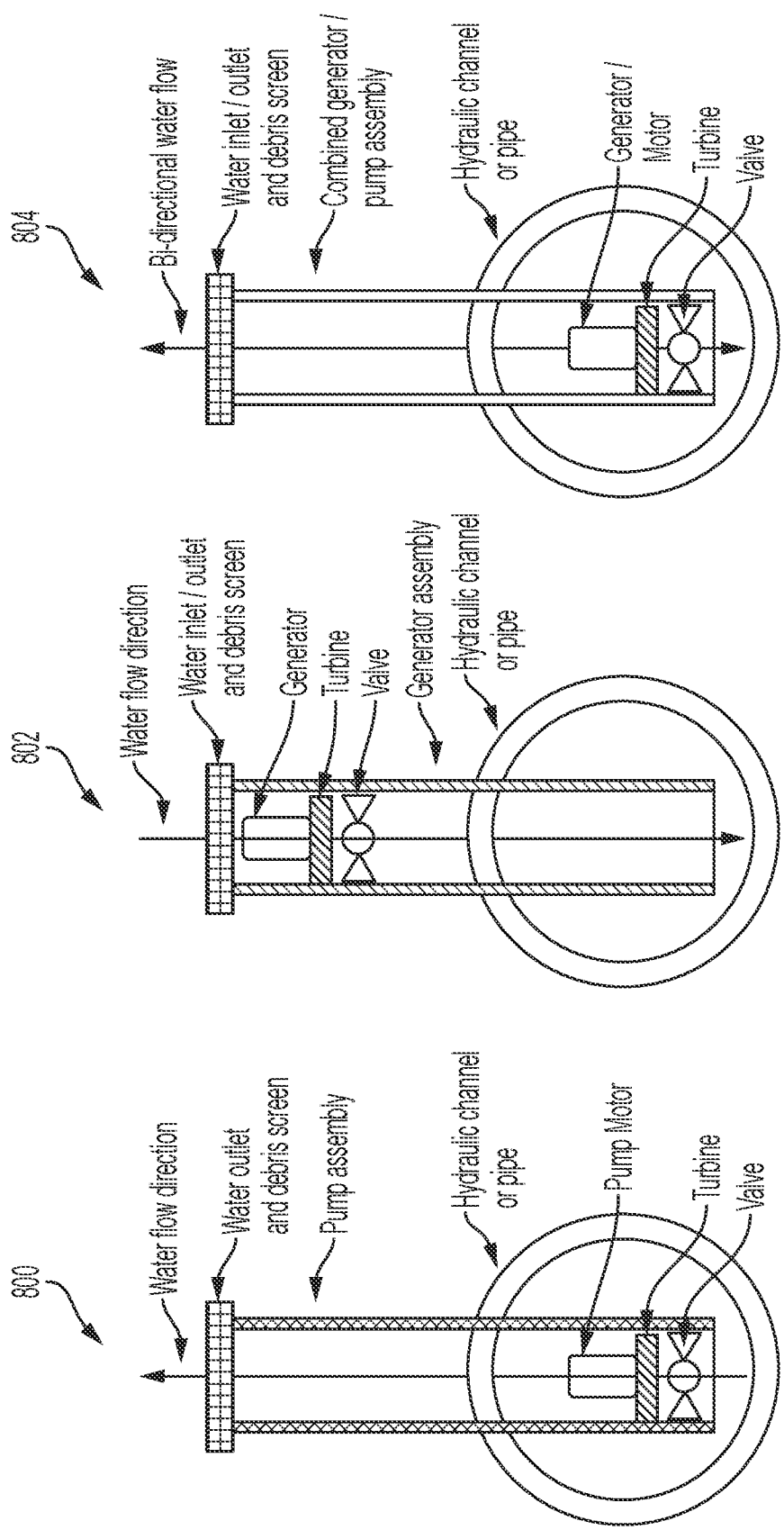
FIG. 8 is a schematic diagram, in cross-section, showing examples of a pump assembly, a generator assembly, and a combined pump/generator assembly for an underwater energy storage system.

Now referring to FIG. 8, a schematic diagram is presented, in cross-section, of an example pump assembly 800, an example generator assembly 802, and an example combined pump/generator assembly 804 for an underwater energy storage system. The example pump assembly 800, the example generator assembly 802, and the example combined pump/generator assembly 804 are contained in respective tubular housings, each of which having first and second ends. The first ends are disposed in a conduit of a conduit system and the second ends are exposed to an exterior environment (e.g., an underwater environment). The first ends have respective first openings that allow an exchange of fluid with the conduit system, and the second ends have openings that allow an exchange of fluid with the exterior environment. A debris screen covers each of the second openings to prevent debris or unwanted objects from entering the tubular housings. In some variations, the tubular housings may include one or more valves to control a flow of water therethrough (e.g., control magnitude of flow, a direction of flow, etc.).

The example pump assembly 800, which may include a turbine, is configured to allow a flow of fluid (e.g., water) from the conduit system to the exterior environment. When the pump of the example pump assembly 800 operates to transport fluid from the conduit system to the exterior environment—e.g., transport water against a hydrostatic pressure of the exterior environment—the pump may operate to store energy. Conversely, the example generator assembly 802, which may also include a turbine, is configured to allow a flow of fluid (e.g., water) from the conduit system to the exterior environment. When the generator of the example generator assembly 802 moves (e.g., rotates) in response to fluid moving from the exterior environment to the conduit system—e.g., water driven by action of the hydrostatic pressure of the exterior environment—the generator may operate to produce electrical energy. The example combined pump/generator assembly 804 is configured to allow a flow of fluid (e.g., water) bi-directionally between the conduit system and the exterior environment. The pump and the generator of the example combined pump/generator assembly 804 may operate analogously to, respectively, the pump of the example pump assembly 800 and the generator of the example generator assembly 802. In some variations, the pump and the generator of the example combined pump/generator assembly 804 may be coupled to each other, such as through one or more gears or a shaft shared in common. The combined pump/generator assembly 804 may include a turbine, such as a turbine shared in common by the pump and the generator.

In certain cases, the components of the example system 200—e.g., the base 202, the plurality of domed walls 204, the anchor 206, the housing 216, and so forth—can be manufactured using additive manufacturing methods, such as automated 3D concrete printing or spray methods. These methods may reduce the manufacturing cost and footprint, increase production rates, and improve worker safety. In some instances, the methods may include conventional processes such as casting of concrete materials or incorporating steel components or reinforcement. In some implementations, one or more of the plurality of domed walls 204 are formed at least in part of hardened layers of cementitious material deposited successively on top of each other (e.g., by printing, spray, etc.). In some implementations, the base is formed at least in part of hardened layers of cementitious material deposited successively on top of each other e.g., by printing, spray, etc.).

Several methods exist for manufacturing, transporting, launching, and recovering an MPH system (e.g., the example system 200 of FIG. 2) from an installation site. The methods can be used in various combinations depending on the available facilities, resources, equipment, and system requirements. In some implementations, the methods include using 3D concrete printing and automated concrete spraying to fabricate the MPH system on a low cost barge located next to a quay. The completed MPH system is then transported on the barge to deeper water near the installation site for launching and installation. A multipurpose semi-submersible may be used to lift the MPH system from the barge and lower it to the underwater floor (e.g., a seabed) for installation. The process may be reversed for recovery, operations and maintenance, or decommissioning.

In some implementations, the methods include the use of concrete printing and concrete spraying to manufacture the MPH system. The methods may also include manufacturing the MPH system on a floating platform. In some implementations, the methods include using a multi-purpose floating platform to lift the MPH system from a barge. The methods may also include using the multi-purpose floating platform to transport or position the MPH system for installation and recovery. The methods may additionally include using the multi-purpose floating platform transport to lower or raise the MPH to or from the underwater floor.

Several methods of manufacturing can be used to fabricate the cementitious components of the MPH system, such as concrete casting, 3D Concrete Printing (3DCP), concrete spraying, or some combination thereof. The methods may be used to fabricate portions of the MPH structure or the entire structure. In some implementations, the methods include 3D printing concrete to fabricate one or more walls of a domed structure and a base followed by spraying of concrete onto the walls. The 3DCP-fabricated wall may form a type of stay-in-place formwork onto which additional concrete materials can be sprayed using a manual or automated concrete spraying system (e.g., in a shotcrete deposition). As such, the methods may quickly create a highly consolidated, high strength bond with the 3DCP formwork and reinforcement materials. The shotcrete materials can be sprayed on an interior or exterior of the stay-in-place formwork or on both sides using a manual or automated process.

Spraying of concrete, sometimes referred to as shotcrete deposition or a shotcrete process, may include applying projected concrete at high velocity primarily onto a vertical or overhead surface. The impact created by the deposition consolidates the concrete. Although the hardened properties of shotcrete concrete are similar to those of conventional cast-in-place concrete, the nature of the deposition process results in an excellent bond with most substrates. The shotcrete process also allows for rapid or instant fabrication capabilities, particularly with complex forms or shapes. The shotcrete process can require less formwork and can be more economical than conventionally placed concrete. Shotcrete cementitious material may be applied using a wet-mix or dry-mix shotcrete process. The wet-mix shotcrete process mixes all ingredients, including water, before introduction into the delivery hose. The dry-mix shotcrete process adds water to the mix at the nozzle. Shotcrete deposition can be used in new construction or repairs of existing construction, and is suitable for curved and thin elements.

In some implementations, the sprayed, printed, and cast cementitious materials incorporate aggregates and various reinforcement materials. These materials may also use binders such as Portland cement or geopolymer cement. Fibrous reinforcement materials such as basalt, polymer, glass, carbon, or steel fibers can be mixed and applied during the printing or spraying process to increase the strength of the hardened concrete body. The fibrous reinforcement materials may also help mitigate shrinkage effects during hardening and curing. Meshes and cable reinforcement can also be incorporated into the 3D printing process. In some instances, the meshes and cable reinforcement may also be applied between applications of printing or spraying.

Figure 9:
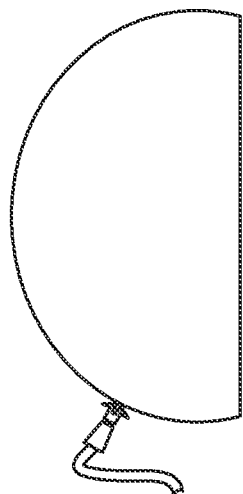
FIG. 9 is a schematic diagram showing stages of an example 3D Concrete Printing (3DCP) process used to fabricate a domed wall.
Figure 9:
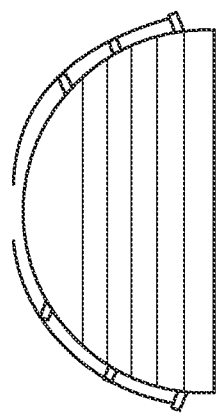
Figure 9:
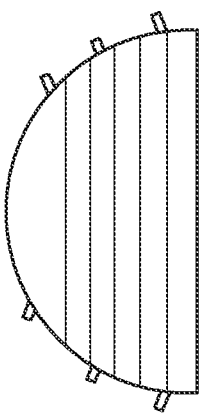

In some implementations, the 3DCP process can be used to incorporate features such as channels, guide holes, or shelves into the stay-in-place formwork that facilitate the placement and positioning of reinforcement materials (e.g., rebar, post tensioning cables, etc.). The features may also allow for the placement and positioning of MPH system components, such as valves, pipes, screens, flanges in the formwork, and so forth. The MPH system components can be bonded to the existing cementitious materials or to other components using additional materials applied with 3DCP, shotcrete, casting, or grouting, such as shown in FIG. 9. For example, during an initial stage of the 3DCP process, such as shown in the leftmost illustration of FIG. 9, an inner wall of a dome is formed by successively depositing layers of cementitious material on top of each other (e.g., by 3D concrete printing). Geometric features such as grooves or tabs for locating reinforcement materials can be formed at this stage as the inner wall is being formed. During a subsequent stage of the 3DCP process, such as shown in the middle illustration of FIG. 9, reinforcement materials such as rebar are positioned on the inner wall. During a final stage of the 3DCP process, such as shown in the rightmost illustration of FIG. 9, deposition of the layers of cementitious materials continues, thereby covering or embedding the reinforcement materials in the inner wall. For example, the cementitious materials may be sprayed on the reinforcement materials and inner wall. The sprayed cementitious material bonds the reinforcement materials to the inner wall and protects the reinforcement materials from corrosive chemical attack (e.g., from a marine environment).

Figure 10:
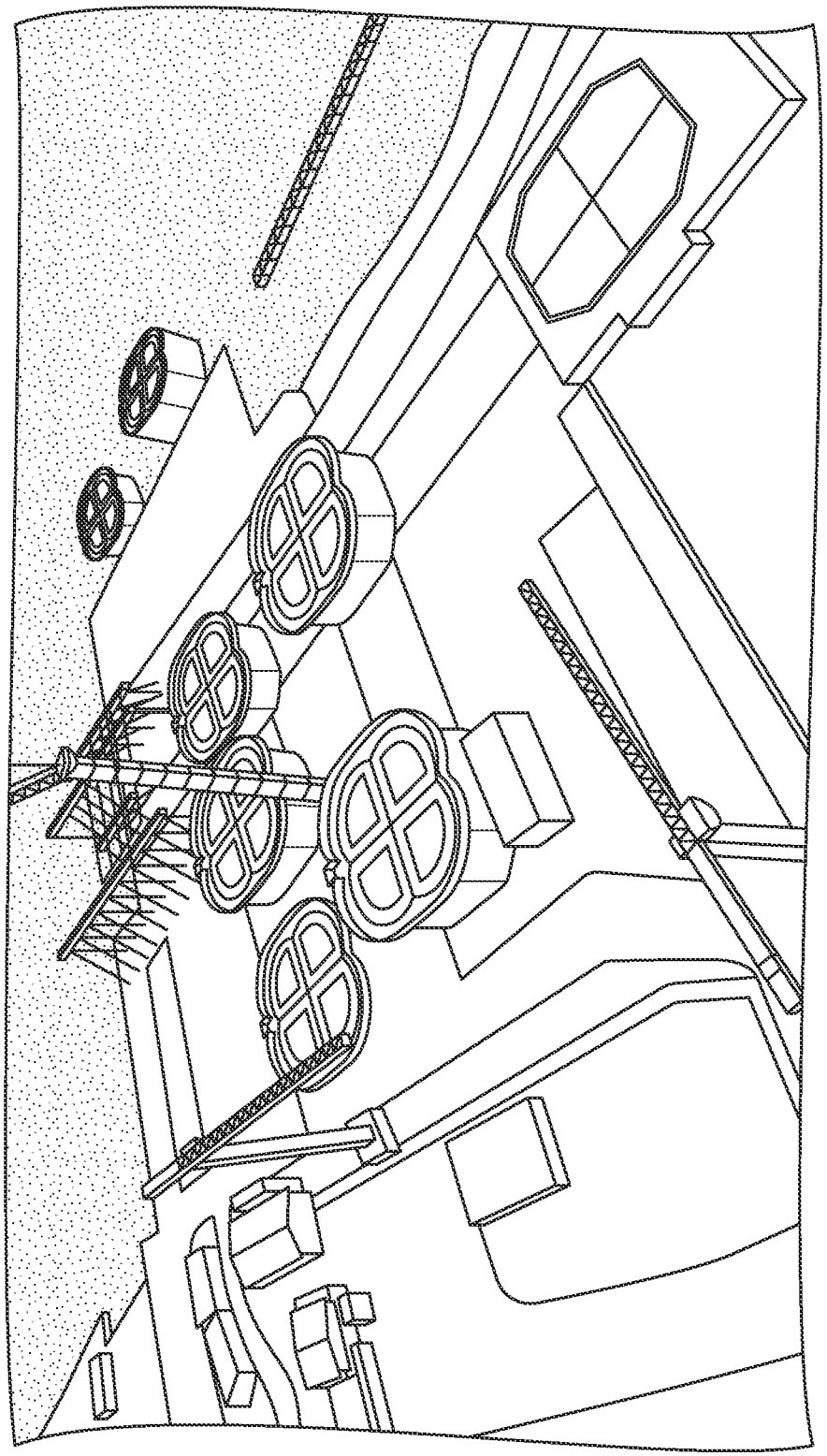
FIG. 10 is a schematic diagram of an example onshore manufacturing plant that includes a rail and jacking system for moving marine caissons.

In some implementations, the MPH system is manufactured onshore, such as on a quay. Components for the MPH system may be transferred directly into the water from the quay using heavy lifting equipment (e.g., crane). The components may also be loaded onto a floating platform or vessel using a rail and jacking system designed for moving heavy lifting equipment, such as shown in FIG. 10.

Figure 11:
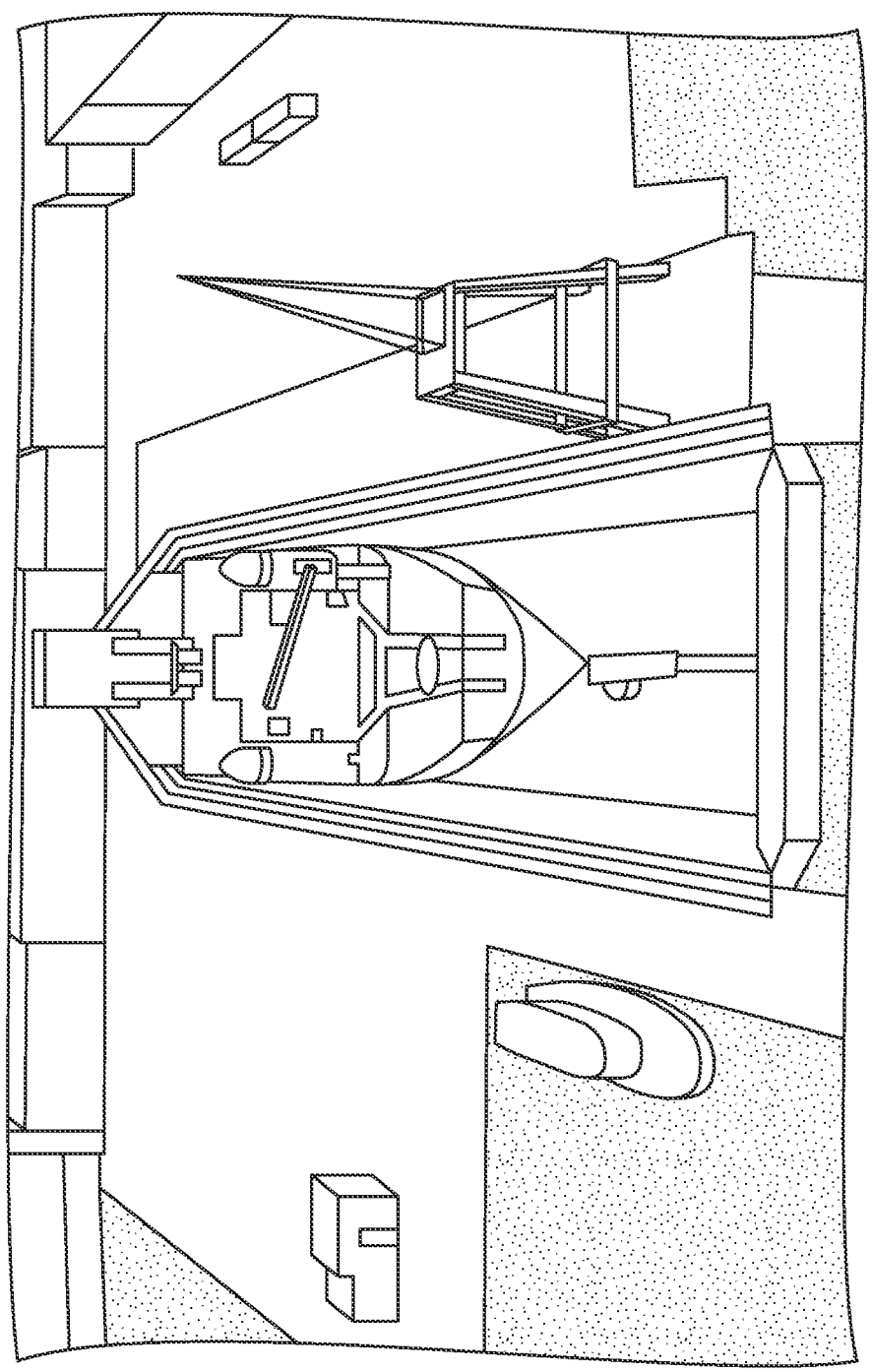
FIG. 11 is a schematic diagram of an example graving dry dock.

In some implementations, the MPH system is manufactured in a graving dry dock. FIG. 11 presents a schematic diagram of an example graving dry dock. The graving dry dock may be a dock used for ship construction (or repair) that is constructed on land adjacent to water. The graving dry dock may have a rectangular shape with a gate to control water flow. Manufacturing of the MPH system can occur in the graving dry dock with the gate closed and water pumped out. After manufacture of the MPH system is complete, water can be pumped into the graving dry dock, the MPH system floated, and the gates opened to allow the MPH system to be floated and wet towed to the installation site.

In some implementations, the MPH system is manufactured on a floating platform. Onshore construction plants and graving docks of sufficient size, capacities, and numbers for the mass manufacturing of MPH systems may often be unavailable in many desired locations. Moreover, onshore construction sites may require expensive lifting equipment or may be located in ports that are potentially too shallow to wet-tow a larger MPH system. These challenges can be overcome by manufacturing the MPH system on a floating platform such as a barge, a floating dry dock, or a vessel next to a quay. The floating platform can be positioned alongside a quay to facilitate the transfer of materials and labor to the floating platform, as needed, to manufacture the MPH system.

Figure 12A:
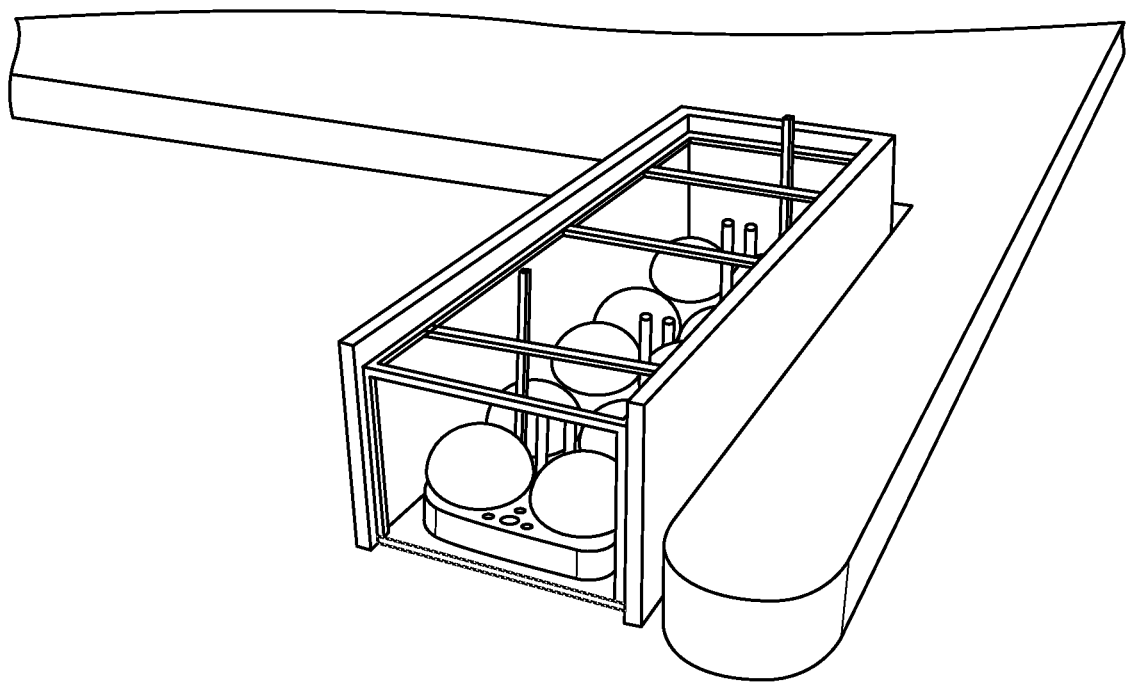
FIG. 12A is a schematic diagram, shown in perspective view, of an example dry-dock floating platform that is stationed at a dock and contains multiple MPH systems therein.
Figure 12B:
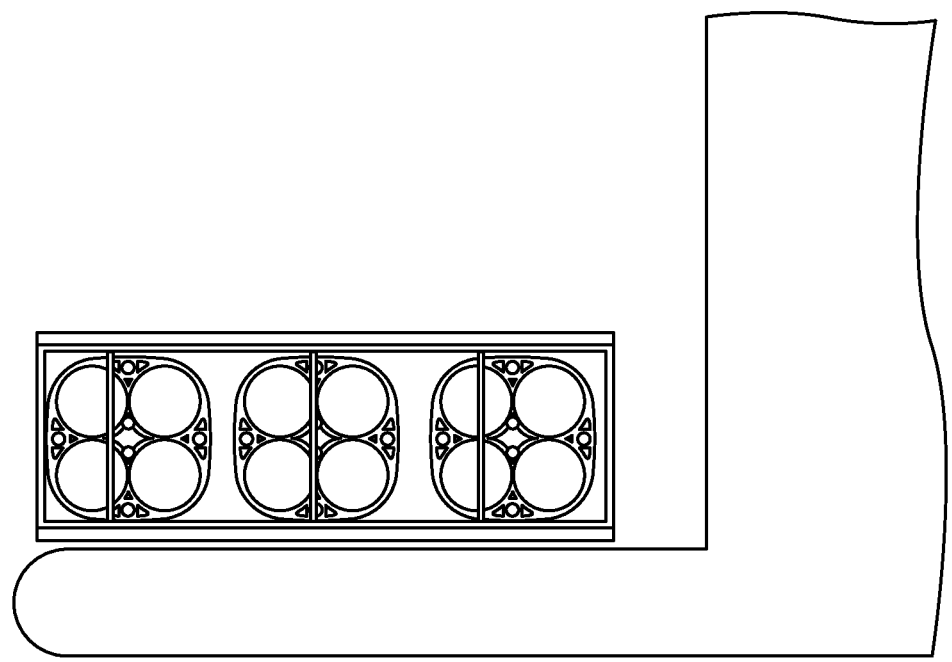
FIG. 12B is a schematic diagram, in top view, of the example dry-dock floating platform of FIG. 12A.

FIG. 12A presents a schematic diagram, shown in perspective view, of an example dry-dock floating platform that is stationed at a dock and contains multiple MPH systems therein. The example dry-dock floating platform includes a 3D manufacturing system (e.g., a 3D printing or spray system), which is represented by a framed structure in FIG. 12A. The 3D manufacturing system may be used to manufacture the MPH systems, such as by successively depositing layers of cementitious material on top of each other (e.g., by printing, spraying, etc.). The MPH systems may be in the process of being manufactured. FIG. 12B presents a schematic diagram, in top view, of the example dry-dock floating platform of FIG. 12A.

Figure 13A:
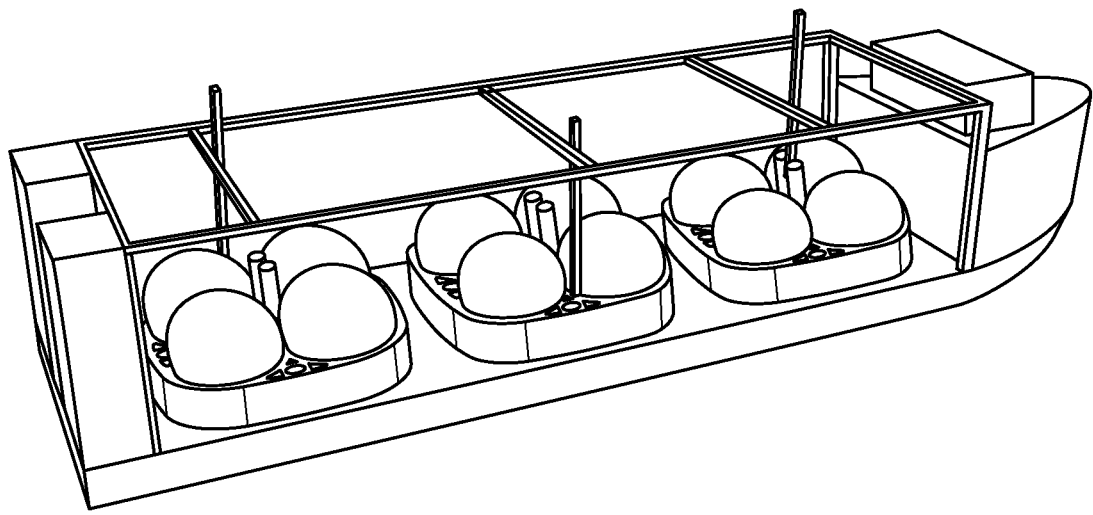
FIG. 13A is a schematic diagram, in perspective view, of the example submersible barge located on a body of water.
Figure 13B:
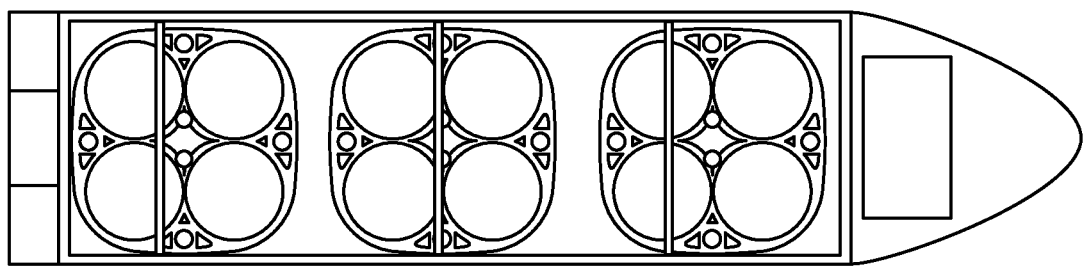
FIG. 13B is a schematic diagram, in top view, of the example submersible barge of FIG. 13A.

FIG. 13A presents a schematic diagram, in perspective view, of the example submersible barge located on a body of water. The example submersible barge, which corresponds to a floating platform, may be transporting the MPH systems over the body of water or be positioned to install the MPH systems at a target location under the body of water (e.g., the underwater floor). FIG. 13B presents a schematic diagram, in top view, of the example submersible barge of FIG. 13A. The example submersible barge includes a 3D manufacturing system (e.g., a 3D printing or spray system), which is represented by a framed structure in FIGS. 13A-13B. The 3D manufacturing system may be used to manufacture the MPH systems, such as by successively depositing layers of cementitious material on top of each other (e.g., by printing, spraying, etc.).

In some variations, the floating platforms my include equipment for the 3D printing and spraying of cementitious materials. The equipment may be part of one or more automated manufacturing systems. The 3D printing and concrete spraying process may eliminate removeable formwork, thereby reducing the work area required for manufacturing an MPH system on the floating platform. Moreover, automated manufacturing systems (e.g., 3D printers, 3D shotcrete systems, and reinforcement systems) may allow several floating platforms and manufacturing systems to be used simultaneously, thereby increasing production rates. Furthermore, the automated manufacturing systems and other necessary equipment (e.g., such as material delivery and hoisting equipment) can be placed on the floating platform to create a mobile factory capable of being used at and moved to different ports.

Certain configurations of an MPH system may include massive structures that make transporting, launching, and recovering the MPH system challenging. For example, an MPH system based on four storage spheres and designed for utility-scale grid storage could weigh on the order of 100,000 tons. Such weight is more than most onshore crane systems can lift and the corresponding size can prevent transportation over roads. In some aspects of what is described here, a method for transporting an MPH system may include a wet tow process, a deck carry process, or both. Wet towing or deck carrying (e.g., such as with a submersible vessel) can also be used to help launch and recover the MPH system at the installation site.

At the installation site, buoyancy chambers in the MPH system can be filled with water to lower the MPH system to an underwater floor in a controlled fashion. Alternatively, lifting equipment can be used to lower the MPH system to the underwater floor. After the MPH system reaches the underwater floor, a variety of anchoring mechanisms, such as screw anchors or suction anchors (or suction piles), can be embedded into the seafloor to secure the MPH system to the underwater floor, if desired. Alternatively, the MPH system can be fastened to a preinstalled foundation system already anchored to the underwater floor. The use of a preinstalled foundation system may allow faster installation and retrieval of the MPH system for maintenance purposes. The lowering process can be reversed for recovery of the MPH system.

Figure 14:
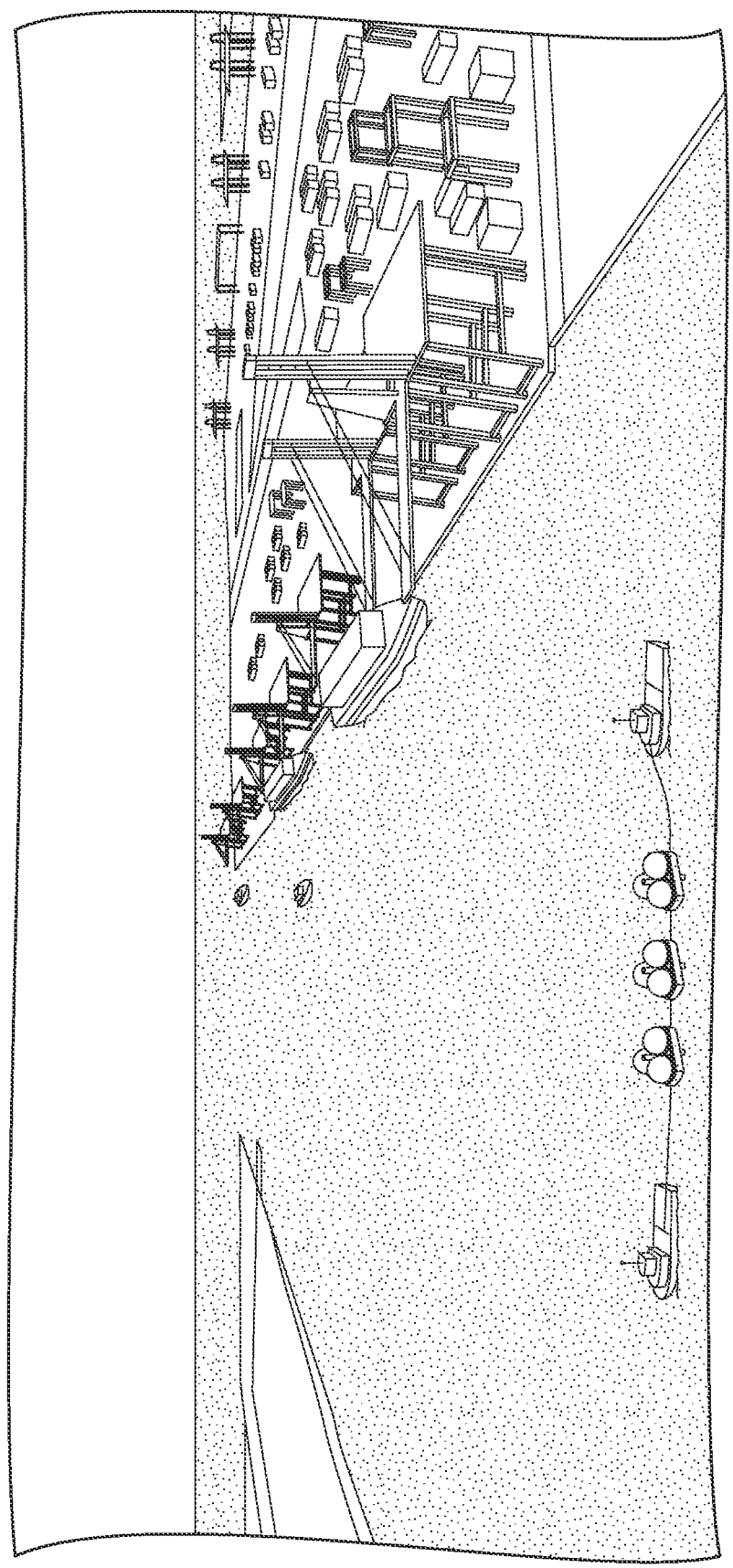
FIG. 14 is a schematic diagram of an example wet-tow process that includes multiple MPH systems being towed by tug boats on the surface of a body of water.

In some implementations, the method for transporting the MPH system includes a wet tow process. In these implementations, the MPH system may be designed with sufficient buoyancy and sea-keeping ability that it can be floated and wet-towed to a desired location. For example, the MPH system may be floated and wet-towed from a manufacturing site to an intermediate site (e.g., a wet storage site) or to an installation site. FIG. 14 presents a schematic diagram of an example wet-tow process that includes multiple MPH systems being towed by tug boats on the surface of a body of water.

Supplemental buoyancy systems can be used to provide additional buoyancy during wet-towing, installation, or retrieval if desired by attaching them to the MPH system. In some variations, one or more buoyancy chambers are integrated into the MPH system, such as shown in FIGS. 4A-4B. Alternatively, a floating crane can be used to perform or assist in the lowering (or raising) of the MPH system to the underwater floor. However, in some cases, wet towing may require a graving dock or large onshore construction crane to move the MPH system into or from the water. Moreover, the water at some ports may lack sufficient depth to float a large utility scale MPH system and the wet-towing process can make sea-keeping challenging in rough seas.

In some implementations, the method for transporting the MPH system includes a deck carry process. In these implementations, the MPH system may be manufactured on or loaded onto a floating platform, such as a floating dry dock, submersible heavy-lift vessel, submersible barge, or non-submersible barge. The MPH system may then be transported on the deck to the installation site. Submersible floating platforms—such as floating dry docks, submersible barges, and submersible heavy lift vessels—can transport launch, and recover the MPH system because these platforms can submerge sufficiently to float the MPH system off or on a support surface (e.g., a deck, an underwater floor, etc.) for installation or recovery. These submersible structures can be built in various sizes and be positioned beside a dock for easy transfer of labor and materials. The submersible structures can also be floated to deeper waters for unloading deep draft structures. Standard non-submersible barges and vessels will require an additional lifting system for launching and recovery, such as a floating crane.

Figure 15:
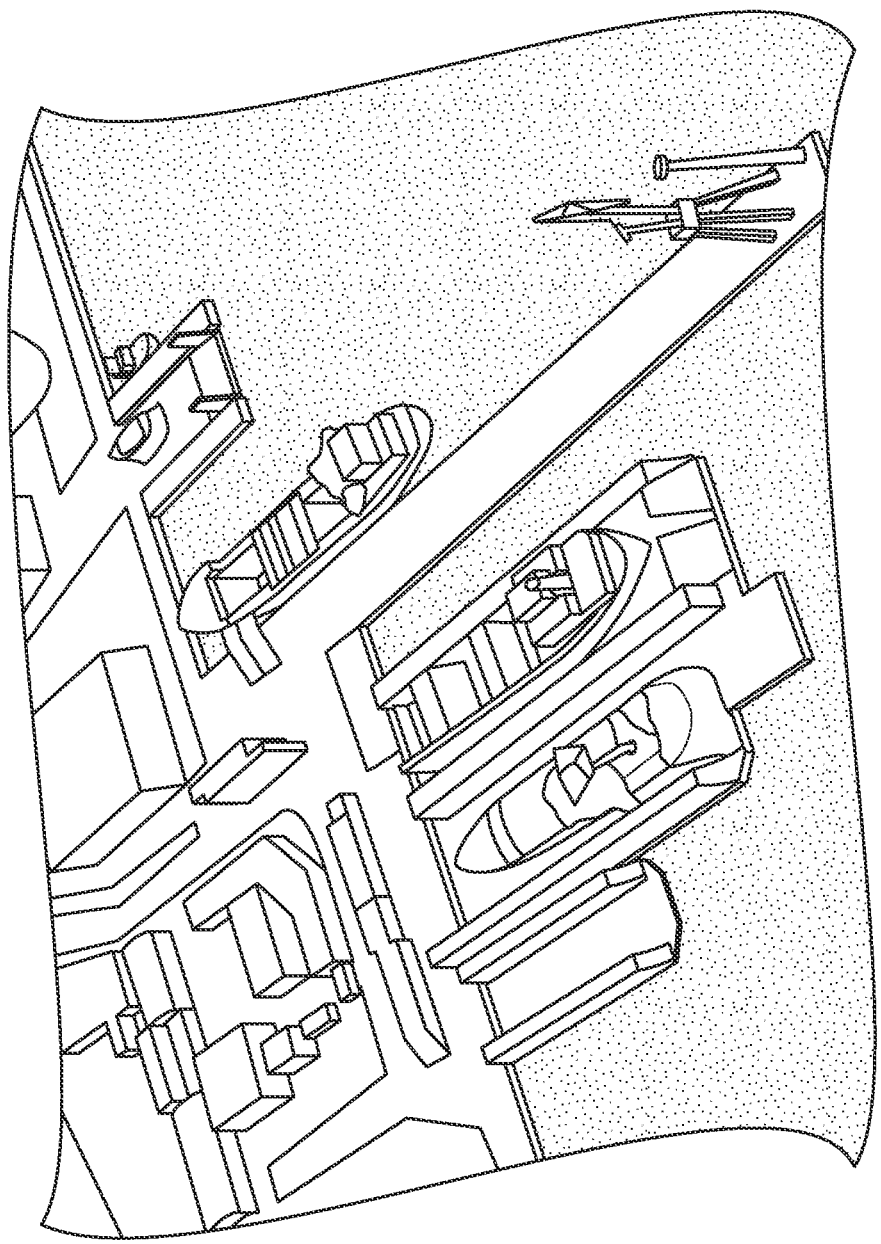
FIG. 15 is a schematic diagram of an example floating dry dock.

In some implementations, an MPH system is manufactured on a floating dry dock, submersible vessel or platform, such as shown in FIGS. 12A-12B. A floating dry dock is similar to a graving dry dock, but is a floatable structure having the cross-sectional form of a "U" structure. FIG. 15 presents a schematic diagram of an example floating dry dock. The floating dry dock may contain a system of valves and buoyancy chambers in its walls and floors that can be opened to fill up with water. These features allow the floating dry dock to raise or lower. Once the MPH system is ready for launching, the floating vessel, platform, or drydock is ballasted to fill the chambers with water allowing it to submerge. The MPH system may then be floated out of the dock or away from the vessel. If the draft of the MPH system is too deep for a port, the dry dock can be floated to deeper water before ballasting the systems and launching the MPH system.

In some aspects of what is described, a system for storing energy underwater may be described by the following examples:

Example 1. A system for storing energy underwater, comprising:
 a base having a bottom side resting on an underwater floor and a top side comprising a plurality of recessed surfaces;
 a plurality of domed walls extending from the top side of the base to form respective fluid chambers, each of the fluid chambers comprising an interior volume that is at least partially defined by one of the recessed surfaces and an interior surface of one of the domed walls;
 a pump configured to pump water (e.g., along a first flow path) from the fluid chambers toward an exterior environment of the system; and
 a generator configured to generate electrical energy in response to water flowing (e.g., along a second flow path) from the exterior environment toward the fluid chambers.

Example 2. The system of example 1, wherein the base comprises a conduit system that provides fluid communication between the fluid chambers.

Example 3. The system of example 2, wherein the base comprises interior surfaces that define the conduit system.

Example 4. The system of example 2 or example 3, wherein the conduit system provides fluid communication between the pump and the fluid chambers and defines at least part of a flow path (e.g., the first flow path) extending between the fluid chambers and the exterior environment of the system.

Example 5. The system of example 2 or any one of examples 3-4, wherein the conduit system provides fluid communication between the generator and the fluid chambers and defines at least part of a flow path (e.g., the second flow path) extending between the fluid chambers and the exterior environment of the system.

Example 6. The system of example 2 or any one of examples 3-5, wherein the recessed surfaces of the base define respective conduit ports to the conduit system.

Example 7. The system of example 1 or any one of examples 2-6, wherein the base and the plurality of domed walls are an integral body.

Example 8. The system of example 1 or any one of examples 2-6, wherein the base and the plurality of domed walls are separate bodies, and each of the domed walls comprises a perimeter edge encircling an opening of the domed wall, and the perimeter edge is sealed to the top side of the base.

Example 9. The system of example 1 or any one of examples 2-8, comprising:
- a pump housing containing the pump and coupled to the base, the pump housing comprising first and second pump housing ports; and
- a generator housing containing the generator and coupled to the base, the generator housing comprising first and second generator housing ports.

Example 10. The system of example 9,
- wherein a first flow path extends between the fluid chambers and the exterior environment of the system and comprises at least a portion extending through the pump housing between the first and second pump housing ports;
- wherein the pump is configured to pump water along the first flow path from the fluid chambers toward the exterior environment;
- wherein a second flow path extends between the fluid chambers and the exterior environment of the system and comprises at least a portion extending through the generator housing between the first and second generator housing ports, the second flow path distinct from the first flow path; and
- wherein the generator is configured to generate electrical energy in response to water flowing along the second flow path from the exterior environment toward the fluid chambers.

Example 11. The system of example 1 or any one of examples 2-8, comprising:
- a housing containing a combined pump/generator assembly that comprises the pump and the generator, the housing coupled to the base and comprising first and second housing ports.

Example 12. The system of example 11,
- wherein a third flow path extends between the fluid chambers and the exterior environment of the system and comprises at least a portion extending through the housing between the first and second housing ports;
- wherein the pump is configured to pump water along the third flow path from the fluid chambers toward the exterior environment;
- wherein the generator is configured to generate electrical energy in response to water flowing along the third flow path from the exterior environment into the fluid chambers.

Example 13. The system of example 1 or any one of examples 2-12, comprising an anchor coupling the base to the underwater floor.

Example 14. The system of example 13, wherein the anchor is a suction pile.

Example 15. The system of example 1 or any one of examples 2-14, wherein the base comprises a buoyancy chamber.

Example 16. The system of example 1 or any one of examples 2-15, wherein the base comprises a pocket configured to hold ballast material, the pocket having an opening accessible from an exterior of the base.

Example 17. The system of example 1 or any one of examples 2-16, comprising an electrical cable that communicates electrical power between an onshore electrical system and one or both of the pump and the generator.

Example 18. The system of example 1 or any one of examples 2-17, comprising an electrical cable that communicates electrical power between an offshore platform and one or both of the pump and the generator.

Example 19. The system of example 1 or any one of examples 2-18, comprising an electrical cable that communicates electrical power between a transformer and one or both of the pump and the generator.

Example 20. The system of example 19, wherein the transformer is electrically coupled to a wind turbine.

Example 21. The system of example 19 or example 20, wherein the transformer is electrically coupled to a solar panel.

Example 22. The system of example 1 or any one of examples 2-21, wherein one or more of the plurality of domed walls are formed at least in part of hardened layers of cementitious material deposited successively on top of each other.

Example 23. The system of example 1 or any one of examples 2-22, wherein the base is formed at least in part of hardened layers of cementitious material deposited successively on top of each other.

In some aspects of what is described, a method for storing energy underwater may be described by the following examples:

Example 24. A method for storing energy underwater comprising:
- pumping water (e.g., along a first flow path) from fluid chambers of an underwater energy storage system to an exterior environment of the underwater energy storage system, the underwater energy storage system comprising:
  - a base having a bottom side resting on an underwater floor and a top side comprising a plurality of recessed surfaces;
  - a plurality of domed walls extending from the top side of the base to form the respective fluid chambers, each of the fluid chambers comprising an interior volume that is at least partially defined by one of the recessed surfaces and an interior surface of one of the domed walls;
- generating electrical energy in response to water flowing (e.g., along a second flow path) from the exterior environment into the fluid chambers.

Example 25. The method of example 24,
- wherein the exterior environment comprises water having a hydrostatic pressure; and
- wherein pumping water comprises transporting the water into the exterior environment against the hydrostatic pressure to store energy.

Example 26. The method of example 24 or example 25,
- wherein the exterior environment comprises water having a hydrostatic pressure; and
- wherein generating electrical energy comprises driving water into the fluid chambers by action of the hydrostatic pressure.

Example 27. The method of example 24 or any one of examples 25-26,
- wherein the base comprises a conduit system providing fluid communication between the fluid chambers; and wherein the conduit system defines at least part of the first and second flow paths.

Example 28. The method of example 27,
wherein pumping water comprises transporting water through the conduit system from the fluid chambers towards the exterior environment; and
wherein generating electrical energy comprises transporting water through the conduit system from the exterior environment towards the fluid chambers.

Example 29. The method of example 24 or any one of examples 25-28,
wherein pumping water comprises transporting water along a first flow path from the fluid chambers toward the exterior environment;
wherein the electrical energy is generated in response to water flowing along a second flow path from the exterior environment toward the fluid chambers; and
wherein the first and second flow paths are distinct from each other.

Example 30. The method of example 24 or any one of examples 25-28,
wherein pumping water comprises transporting water along a first flow path from the fluid chambers toward the exterior environment;
wherein the electrical energy is generated in response to water flowing along a second flow path from the exterior environment toward the fluid chambers; and
wherein the first and second flow paths are the same flow path.

Example 31. The method of example 24 or any one of examples 25-30, comprising:
supplying electrical energy to a pump;
wherein the pump uses the supplied electrical energy to pump water into the exterior environment.

Example 32. The method of example 31, wherein supplying the electrical energy comprises:
receiving, at a transformer, electrical energy from a source of electrical energy; and
transforming, by operation of the transformer, the received electrical energy to produce the supplied electrical energy (e.g., transforming voltage, a current, or a phase of the electrical energy).

Example 33. The method of example 31 or example 32, comprising:
converting, by operation of a solar panel, solar energy into a solar-derived electrical energy; and
wherein supplying the electrical energy comprises transferring the solar-derived electrical energy to the pump.

Example 34. The method of example 31 or any one of examples 32-33, comprising:
converting, by operation of a wind turbine, wind energy into a wind-derived electrical energy; and
wherein supplying the electrical energy comprises transferring the wind-derived electrical energy to the pump.

Example 35. The method of example 24 or any one of examples 25-34, comprising:
providing, through an electrical cable, the generated electrical energy to an electrical system.

Example 36. The method of example 35, wherein providing the generated electrical energy comprises:
receiving, at a transformer, the generated electrical energy; and
transforming, by operation of the transformer, the generated electrical energy.

Example 37. The method of example 35 or example 36, wherein the electrical system is disposed at an onshore location; and
wherein providing the generated electrical energy comprises transferring the generated electrical energy to the onshore location.

Example 38. The method of example 35 or example 36,
wherein the electrical system is disposed on an offshore platform; and
wherein providing the generated electrical energy comprises transferring the generated electrical energy to the offshore platform.

Example 39. The method of example 24 or any one of examples 25-38, comprising:
submerging the underwater energy storage system in a body of water; and
coupling the base of the underwater energy storage system to the underwater floor, thereby allowing the bottom side of the base to rest on the underwater floor.

Example 40. The method of example 39, wherein submerging the underwater energy storage system comprises receiving water into a buoyancy chamber of the base.

Example 41. The method of example 39 or example 40, comprising receiving ballast material into a pocket of the base, the pocket configured to hold ballast material and having an opening accessible from an exterior of the base.

Example 42. The method of example 39 or any one of examples 40-41, comprising:
decoupling the base of the underwater energy storage system from the underwater floor, thereby allowing the bottom side of the base to separate from the underwater floor; and
raising the underwater energy storage system out of the body of water.

Example 43. The method of example 42, wherein raising the underwater energy storage system comprises discharging water from a buoyancy chamber of the base.

Example 44. The method of example 42 or example 43, comprising removing ballast material from a pocket of the base, the pocket configured to hold ballast material and having an opening accessible from an exterior of the base.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for storing energy underwater, comprising:
a base having a bottom side resting on an underwater floor and a top side comprising a plurality of recessed surfaces, the base comprising a conduit system;
a plurality of domed walls extending from the top side of the base to form respective fluid chambers, each of the fluid chambers comprising an interior volume that is at least partially defined by one of the recessed surfaces and an interior surface of one of the domed walls, the fluid chambers in fluid communication with each other through the conduit system;
a pump coupled to the conduit system and configured to pump water through the conduit system from the fluid chambers toward an exterior environment of the system; and
a generator coupled to the conduit system and configured to generate electrical energy in response to water flowing through the conduit system from the exterior environment into the fluid chambers;
wherein the conduit system comprises:
a central union, and
a plurality of conduits extending from the central union to respective fluid chambers, the plurality of conduits disposed in the conduit system such that water flowing between the exterior environment and at least a subset of the fluid chambers flows through the central union.

2. The system of claim 1, wherein the base comprises interior surfaces that define the conduit system.

3. The system of claim 1, wherein the conduit system provides fluid communication between the fluid chambers and one or both of the pump and the generator; and wherein the conduit system defines at least part of a set of flow paths that extend between respective ones of the fluid chambers and the exterior environment of the system.

4. The system of claim 1, wherein the recessed surfaces of the base define respective conduit ports to the conduit system.

5. The system of claim 1, wherein the base and the plurality of domed walls are an integral body.

6. The system of claim 1,
wherein the base and the plurality of domed walls are separate bodies; and
wherein each domed wall comprises a perimeter edge that encircles an opening of the domed wall and is sealed to the top side of the base.

7. The system of claim 1, comprising:
a pump housing that contains the pump and is coupled to the base, the pump housing comprising first and second pump housing ports; and
a generator housing that contains the generator and is coupled to the base, the generator housing comprising first and second generator housing ports.

8. The system of claim 7,
wherein a first set of flow paths extends through the conduit system between respective ones of the fluid chambers and the exterior environment of the system, the first set of flow paths each comprising at least a portion that extends through the pump housing between the first and second pump housing ports;
wherein the pump is configured to pump water along the first set of flow paths from the fluid chambers toward the exterior environment;
wherein a second set of flow paths extends through the conduit system between respective ones of the fluid chambers and the exterior environment of the system, the second set of flow paths each comprising at least a portion that extends through the generator housing between the first and second generator housing ports, the second set of flow paths distinct from the first set of flow paths; and
wherein the generator is configured to generate electrical energy in response to water flowing along the second set of flow paths from the exterior environment into the fluid chambers.

9. The system of claim 1, comprising:
a housing containing a combined pump/generator assembly that comprises the pump and the generator, the housing coupled to the base and comprising first and second housing ports.

10. The system of claim 9,
wherein a third set of flow paths extends through the conduit system between respective ones of the fluid chambers and the exterior environment of the system, the third set of flow paths each comprising at least a portion that extends through the housing between the first and second housing ports;
wherein the pump is configured to pump water along the third set of flow paths from the fluid chambers toward the exterior environment;
wherein the generator is configured to generate electrical energy in response to water flowing along the third set of flow paths from the exterior environment into the fluid chambers.

11. The system of claim 1, comprising an anchor coupling the base to the underwater floor.

12. The system of claim 1, wherein the base comprises a pocket configured to hold ballast material, the pocket having an opening accessible from an exterior of the base.

13. The system of claim 1, comprising an electrical cable that communicates electrical power between an onshore electrical system and one or both of the pump and the generator.

14. The system of claim 1, comprising an electrical cable that communicates electrical power between an offshore platform and one or both of the pump and the generator.

15. A method comprising:
pumping water through a conduit system from fluid chambers of an underwater energy storage system to an exterior environment of the underwater energy storage system; and
generating electrical energy in response to water flowing through the conduit system from the exterior environment into the fluid chambers;
wherein the underwater energy storage system comprises:
a base comprising the conduit system and having a bottom side resting on an underwater floor and a top side comprising a plurality of recessed surfaces, and
a plurality of domed walls extending from the top side of the base to form respective fluid chambers of the underwater energy storage system, each of the fluid chambers comprising an interior volume that is at least partially defined by one of the recessed surfaces and an interior surface of one of the domed walls, the fluid chambers in fluid communication with each other through the conduit system; and
wherein the conduit system comprises:
a central union, and
a plurality of conduits extending from the central union to respective fluid chambers of the underwater energy storage system, the plurality of conduits disposed in the conduit system such that water flowing between the exterior environment and at least a subset of the fluid chambers flows through the central union.

16. The method of claim 15,
wherein the exterior environment comprises water having a hydrostatic pressure; and
wherein pumping water comprises transporting the water through the conduit system into the exterior environment against the hydrostatic pressure to store energy.

17. The method of claim 15,
wherein the exterior environment comprises water having a hydrostatic pressure; and
wherein generating electrical energy comprises driving water through the conduit system into the fluid chambers by action of the hydrostatic pressure.

18. The method of claim 15,
wherein the conduit system defines at least part of a set of flow paths that extend between respective ones of the fluid chambers and the exterior environment.

19. The method of claim 15,
wherein pumping water comprises transporting water along a first set of flow paths from respective ones of the fluid chambers toward the exterior environment, the first set of flow paths extending through the conduit system;
wherein generating electrical energy comprises generating electrical energy in response to water flowing along a second set of flow paths from the exterior environment toward respective ones of the fluid chambers, the second set of flow paths extending through the conduit system; and
wherein the first and second sets of flow paths are distinct from each other.

20. The method of claim 15,
wherein pumping water comprises transporting water along a first set of flow paths from respective ones of the fluid chambers toward the exterior environment, the first set of flow paths extending through the conduit system;
wherein generating electrical energy comprises generating electrical energy in response to water flowing along a second set of flow paths from the exterior environment toward respective ones of the fluid chambers, the second set of flow paths extending through the conduit system; and
wherein the first and second sets of flow paths are coincident with each other.

21. The method of claim 15, comprising:
supplying electrical energy to a pump, thereby energizing the pump to transport the water through the conduit system from the fluid chambers to the exterior environment.

22. The method of claim 21, wherein supplying the electrical energy comprises:
receiving, at a transformer, electrical energy from a source of electrical energy; and
transforming, by operation of the transformer, the received electrical energy to produce the supplied electrical energy.

23. The method of claim 15, comprising:
providing, through an electrical cable, the generated electrical energy to an electrical system.

24. The method of claim 23, wherein providing the generated electrical energy comprises:
receiving, at a transformer, the generated electrical energy; and
transforming, by operation of the transformer, the generated electrical energy.

25. The method of claim 23,
wherein the electrical system is disposed at an onshore location; and
wherein providing the generated electrical energy comprises transferring the generated electrical energy to the onshore location.

26. The method of claim 23,
wherein the electrical system is disposed on an offshore platform; and
wherein providing the generated electrical energy comprises transferring the generated electrical energy to the offshore platform.

* * * * *

UNITED STATES PATENT AND TRADEMARK OFFICE
CERTIFICATE OF CORRECTION

PATENT NO. : 11,655,794 B2
APPLICATION NO. : 17/681133
DATED : May 23, 2023
INVENTOR(S) : Jason Rust Cotrell It is certified that error appears in the above-identified patent and that said Letters Patent is hereby corrected as shown below:

In the Specification

Column 1, Line 11 After "of" delete "this" therefor

Column 5, Line 50 Delete "cylindrical, cylindrical" and insert -- cylindrical, -- therefor Column 6, Line 56 Delete "202" and insert -- 200 -- therefor Column 9, Line 54 Delete "220" and insert -- 222 -- therefor Column 10, Line 57 Delete "202)." and insert -- 200). -- therefor Column 11, Line 32 Delete "200" and insert -- 202 -- therefor Column 11, Line 42 Delete "rectangular-shaped" and insert -- linear-shaped -- therefor In the Claims Column 23, Line 31 In Claim 3, after "claim 1," insert -- ¶ --

Column 23, Line 33 In Claim 3, after "generator; and" insert -- ¶ --

Signed and Sealed this
Twenty-second Day of August, 2023

Katherine Kelly Vidal
*Director of the United States Patent and Trademark Office*